(12) United States Patent
Nakayama

(10) Patent No.: US 9,298,015 B2
(45) Date of Patent: Mar. 29, 2016

(54) IMAGE BLUR CORRECTION APPARATUS AND IMAGING APPARATUS

(71) Applicant: Sony Corporation, Tokyo (JP)

(72) Inventor: Tatsuyuki Nakayama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 204 days.

(21) Appl. No.: 13/852,000

(22) Filed: Mar. 28, 2013

(65) Prior Publication Data

US 2013/0321916 A1    Dec. 5, 2013

(30) Foreign Application Priority Data

May 29, 2012    (JP) ................................. 2012-122336

(51) Int. Cl.
     *G02B 27/64*      (2006.01)
     *G03B 5/06*      (2006.01)
     *H04N 5/232*      (2006.01)
     *G02B 7/24*      (2006.01)

(52) U.S. Cl.
     CPC ............... *G02B 27/646* (2013.01); *G02B 7/24* (2013.01); *G03B 5/06* (2013.01); *H04N 5/23287* (2013.01); *G03B 2205/0023* (2013.01)

(58) Field of Classification Search
     USPC ................. 359/554, 557, 811, 813, 814, 819; 396/55, 421
     See application file for complete search history.

(56) References Cited

U.S. PATENT DOCUMENTS

| 5,181,056 | A | * | 1/1993 | Noguchi | G03B 5/00 359/554 |
| 2005/0068634 | A1 | * | 3/2005 | Miyatake et al. | ............. 359/676 |
| 2008/0187301 | A1 | * | 8/2008 | Takahashi | ........................ 396/55 |
| 2009/0185796 | A1 | * | 7/2009 | Tsutsumi et al. | ............... 396/55 |
| 2012/0013753 | A1 | * | 1/2012 | Kanda | ...................... 348/208.11 |

FOREIGN PATENT DOCUMENTS

JP      07-274056 A      10/1995
WO    WO 2011155178 A1 * 12/2011 ............... G02B 5/00

* cited by examiner

*Primary Examiner* — Bumsuk Won
*Assistant Examiner* — Balram Parbadia
(74) *Attorney, Agent, or Firm* — Hazuki International, LLC

(57) ABSTRACT

An image blur correction apparatus includes a lens unit configured to include at least one lens, and configured to be turnable in two different directions using, as supporting points, two axes that are orthogonal to an outer housing. The image blur correction apparatus also includes a fixed member configured to turnably support the lens unit in the two directions, a first drive unit configured to be attached to the fixed member, and configured to turn the lens unit in one of the two directions. The image blur correction apparatus further includes a second drive unit configured to be attached to the fixed member, and configured to turn the lens unit in another of the two directions.

9 Claims, 21 Drawing Sheets

1 ··· IMAGING APPARATUS
2 ··· OUTER HOUSING
20 ··· IMAGE BLUR CORRECTION APPARATUS
21 ··· LENS UNIT
22 ··· FIXED MEMBER
23 ··· SUPPORT BARREL
24 ··· MOVABLE BARREL
26 ··· SUPPORTED PORTION
30b ··· INNER SIDE PROTRUSION
30c ··· SLANTED FACE

- 1 · · · IMAGING APPARATUS
- 2 · · · OUTER HOUSING
- 20 · · · IMAGE BLUR CORRECTION APPARATUS
- 21 · · · LENS UNIT
- 22 · · · FIXED MEMBER
- 23 · · · SUPPORT BARREL
- 24 · · · MOVABLE BARREL
- 26 · · · SUPPORTED PORTION
- 30b · · · INNER SIDE PROTRUSION
- 30c · · · SLANTED FACE

| | | | |
|---|---|---|---|
| 1 | IMAGING APPARATUS | 23 | SUPPORT BARREL |
| 2 | OUTER HOUSING | 24 | MOVABLE BARREL |
| 20 | IMAGE BLUR CORRECTION APPARATUS | 26 | SUPPORTED PORTION |
| | | 30b | INNER SIDE PROTRUSION |
| 21 | LENS UNIT | 30c | SLANTED FACE |
| 22 | FIXED MEMBER | | |

20 ··· IMAGE BLUR CORRECTION APPARATUS
21 ··· LENS UNIT
22 ··· FIXED MEMBER
23 ··· SUPPORT BARREL
24 ··· MOVABLE BARREL
26 ··· SUPPORTED PORTION
30b ··· INNER SIDE PROTRUSION

21 ··· LENS UNIT
23 ··· SUPPORT BARREL
24 ··· MOVABLE BARREL
26 ··· SUPPORTED PORTION

21 · · · LENS UNIT
23 · · · SUPPORT BARREL
24 · · · MOVABLE BARREL
26 · · · SUPPORTED PORTION

20 ··· IMAGE BLUR CORRECTION APPARATUS
21 ··· LENS UNIT
22 ··· FIXED MEMBER
23 ··· SUPPORT BARREL
24 ··· MOVABLE BARREL

40 · · · FIRST DRIVE UNIT
41 · · · SECOND DRIVE UNIT

| | |
|---|---|
| 1 ・・・ IMAGING APPARATUS | 23 ・・・ SUPPORT BARREL |
| 2 ・・・ OUTER HOUSING | 24 ・・・ MOVABLE BARREL |
| 20 ・・・ IMAGE BLUR CORRECTION APPARATUS | 26 ・・・ SUPPORTED PORTION |
| | 30b ・・・ INNER SIDE PROTRUSION |
| 21 ・・・ LENS UNIT | 30c ・・・ SLANTED FACE |
| 22 ・・・ FIXED MEMBER | |

1 ··· IMAGING APPARATUS
2 ··· OUTER HOUSING
20 ··· IMAGE BLUR CORRECTION APPARATUS
21 ··· LENS UNIT
22 ··· FIXED MEMBER

23 ··· SUPPORT BARREL
24 ··· MOVABLE BARREL
26 ··· SUPPORTED PORTION
30b ··· INNER SIDE PROTRUSION
30c ··· SLANTED FACE

21 · · · LENS UNIT
22 · · · FIXED MEMBER
26 · · · SUPPORTED PORTION
30b · · · INNER SIDE PROTRUSION
30c · · · SLANTED FACE

50 ··· IMAGE BLUR CORRECTION APPARATUS
51 ··· LENS UNIT
52 ··· FIXED MEMBER
53 ··· SUPPORT BARREL
54 ··· MOVABLE BARREL
56 ··· SUPPORTED PORTION
64 ··· SECOND DRIVE UNIT

50 · · · IMAGE BLUR CORRECTION APPARATUS
51 · · · LENS UNIT
52 · · · FIXED MEMBER
53 · · · SUPPORT BARREL
54 · · · MOVABLE BARREL
56 · · · SUPPORTED PORTION
64 · · · SECOND DRIVE UNIT

51 ··· LENS UNIT
53 ··· SUPPORT BARREL
63 ··· FIRST DRIVE UNIT
64 ··· SECOND DRIVE UNIT

50 · · · IMAGE BLUR CORRECTION APPARATUS
51 · · · LENS UNIT
52 · · · FIXED MEMBER
53 · · · SUPPORT BARREL
54 · · · MOVABLE BARREL
56 · · · SUPPORTED PORTION
64 · · · SECOND DRIVE UNIT

51 · · · LENS UNIT
53 · · · SUPPORT BARREL
63 · · · FIRST DRIVE UNIT
64 · · · SECOND DRIVE UNIT

50 · · · IMAGE BLUR CORRECTION APPARATUS
51 · · · LENS UNIT
52 · · · FIXED MEMBER
53 · · · SUPPORT BARREL
54 · · · MOVABLE BARREL
56 · · · SUPPORTED PORTION
64 · · · SECOND DRIVE UNIT

51 · · · LENS UNIT
53 · · · SUPPORT BARREL
63 · · · FIRST DRIVE UNIT
64 · · · SECOND DRIVE UNIT

50 ··· IMAGE BLUR CORRECTION APPARATUS
51 ··· LENS UNIT
52 ··· FIXED MEMBER
53 ··· SUPPORT BARREL
54 ··· MOVABLE BARREL
56 ··· SUPPORTED PORTION
64 ··· SECOND DRIVE UNIT

51 ∙∙∙ LENS UNIT
53 ∙∙∙ SUPPORT BARREL
63 ∙∙∙ FIRST DRIVE UNIT
64 ∙∙∙ SECOND DRIVE UNIT

IMAGE BLUR CORRECTION APPARATUS AND IMAGING APPARATUS

BACKGROUND

The present technology relates to a technical field regarding image blur correction apparatuses and imaging apparatuses. More specifically, the present technology relates to a technical field for making the configuration simpler and more compact by enabling a support barrel configuring a lens unit to be turned in two different directions inside a fixed member.

In an imaging apparatus such as a video camera and a still camera, an image blur correction apparatus may be provided for correcting image blur by moving a lens in a direction orthogonal to the light axis direction.

The image blur correction apparatus provided in such an imaging apparatus may be configured so that a lens unit, which has a lens, turns in a first direction which is a direction about a first axis with respect to an outer housing, and in a second direction which is a direction about a second axis that is orthogonal to the first axis (e.g., refer to JP H7-274056A).

Image blur correction is performed by, for example, the lens unit being turned in a yaw direction about the first axis, and in a pitch direction about the second axis.

In the image blur correction apparatus described in JP H7-274056A, two gimbal mechanisms, each having a base plate curved in an L shape, are provided to turn the lens unit in the yaw direction and the pitch direction.

The image blur operation is carried out in the pitch direction by turning the lens unit in the pitch direction with respect to one of the gimbal mechanisms, and in the yaw direction by turning the lens unit together with the first gimbal mechanism in the yaw direction with respect to the other gimbal mechanism.

SUMMARY

However, in the image blur correction apparatus described in JP H7-274056A, two gimbal mechanisms are provided to turn the lens unit in the yaw direction and the pitch direction, so that the number of parts is unfortunately increased and the configuration becomes more complex by their presence.

Further, since a part of the two gimbal mechanisms overlap in the direction orthogonal to the light axis, the size in the direction orthogonal to the light axis is increased, which hinders making the apparatus more compact.

Accordingly, there is a need for an image blur correction apparatus and an imaging apparatus to make the configuration simpler and more compact.

According to an embodiment of the present disclosure, there is provided an image blur correction apparatus including a lens unit configured to include at least one lens, and configured to be turnable in two different directions using, as supporting points, two axes that are orthogonal to an outer housing, a fixed member configured to turnably support the lens unit in the two directions, a first drive unit configured to be attached to the fixed member, and configured to turn the lens unit in one of the two directions, and a second drive unit configured to be attached to the fixed member, and configured to turn the lens unit in another of the two directions. The lens unit, which includes a movable barrel configured to hold an optical element and configured to be movable in a light axis direction, and a support barrel configured to movably support the movable barrel in the light axis direction, is extended and retracted by the movable barrel moving in the light axis direction. The support barrel is turnably supported by the fixed member in the two directions. The first drive unit and the second drive unit are arranged on an outer face side in the light axis direction of the support barrel in the fixed member.

Therefore, in the blur correction apparatus, the lens unit support barrel is turnably supported on the fixed member in two different directions.

According to a second embodiment of the present disclosure, as the blur correction apparatus, it is preferable that the movable barrel may be extended forward in the light axis direction with respect to the support barrel when power is turned on.

By configuring so that the movable barrel is extended forward in the light axis direction with respect to the support barrel when the power is turned on, the length of the lens unit in the light axis direction when the power is turned on is longer.

According to a third embodiment of the present disclosure, as the blur correction apparatus, it is preferable that the first drive unit and the second drive unit may be arranged on an outer face side in the light axis direction of the support barrel in the fixed member.

By arranging the first drive unit and the second drive unit in the fixed member on the outer face side in the light axis direction of the support barrel, the first drive unit and the second drive unit are not present on the outer side of the periphery of the support barrel.

According to a fourth embodiment of the present disclosure, as the blur correction apparatus, it is preferable that the fixed member may be arranged in the outer housing.

By arranging the fixed member inside the outer housing, the fixed member does not protrude from the outer housing.

According to a fifth embodiment of the present disclosure, as the blur correction apparatus, it is preferable that the first drive unit and the second drive unit may be arranged on an outer face side of the lens unit in the light axis direction.

By arranging the first drive unit and the second drive unit on the outer face side of the lens unit in the light axis direction, the first drive unit and the second drive unit are not present in the direction orthogonal to the light axis.

According to a sixth embodiment of the present disclosure, as the blur correction apparatus, it is preferable that a supported portion may be provided at an edge portion on an object side of the support barrel. A support portion that supports the supported portion may be provided at an edge portion on an object side of the fixed member.

By providing a supported portion at an edge portion on the object side of the support barrel, and providing a support portion for supporting the supported portion at an edge portion on the object side of the fixed member, a gap is less likely to form between the lens unit and the fixed member when the lens unit is turned, so that is not necessary to provide a member to block the gap.

According to a seventh embodiment of the present disclosure, as the blur correction apparatus, it is desirable that the fixed member may be positioned on an outer side of the lens unit. An inner side protrusion that protrudes inwards may be provided at a position that is further toward an image side than the support portion of the fixed member. A slanted face may be formed on an inner face of the inner side protrusion, the slanted face being father from a light axis with increase in a distance from the support portion.

By positioning a fixed member on the outer side of the lens unit, providing an inner side protrusion that protrudes inwards at a position further toward the image side than the support portion of the fixed member, and forming a slanted face that slants further and further away from the support portion on the inner face of the inner side protrusion, each of the necessary parts can be arranged on the outer face side of the inner side protrusion.

According to an eighth embodiment of the present disclosure, as the blur correction apparatus, it is preferable that the lens unit may be turnable using, as a supporting point, an axis orthogonal to the two axes.

By configuring so that the lens unit can be turned about an axis that is orthogonal to two axes, in addition to being turned about the two axes, the lens unit is also turned about the axis orthogonal to the two axes.

According to another embodiment of the present disclosure, there is provided an imaging apparatus including an image blur correction apparatus configured to include a lens unit that includes at least one lens and an outer housing that has the lens unit arranged therein. The lens unit is configured to correct image blur by being turnable in two different directions using, as supporting points, two axes that are orthogonal to the outer housing. The image blur correction apparatus includes a fixed member configured to turnably support the lens unit in the two directions, a first drive unit configured to be attached to the fixed member and configured to turn the lens unit in one of the two directions, and a second drive unit configured to be attached to the fixed member and configured to turn the lens unit in another of the two directions. The lens unit, which has a movable barrel configured to hold an optical element and configured to be turnable in a light axis direction, and a support barrel configured to movably support the movable barrel in the light axis direction, is extended and retracted by the movable barrel moving in the light axis direction. The support barrel is turnably supported by the fixed member in the two directions.

Therefore, for the imaging apparatus, in the blur correction apparatus, the lens unit support barrel is turnably supported on the fixed member in two different directions.

According to an embodiment of the present disclosure, there is provided an image blur correction apparatus including a lens unit configured to include at least one lens, and configured to be turnable in two different directions using, as supporting points, two axes that are orthogonal to an outer housing, a fixed member configured to turnably support the lens unit in the two directions, a first drive unit configured to be attached to the fixed member, and configured to turn the lens unit in one of the two directions, and a second drive unit configured to be attached to the fixed member, and configured to turn the lens unit in another of the two directions. The lens unit, which includes a movable barrel configured to hold an optical element and configured to be movable in a light axis direction, and a support barrel configured to movably support the movable barrel in the light axis direction, is extended and retracted by the movable barrel moving in the light axis direction. The support barrel is turnably supported by the fixed member in the two directions. The first drive unit and the second drive unit are arranged on an outer face side in the light axis direction of the support barrel in the fixed member.

Therefore, since the lens unit is turned in at least two different directions because the support barrel is supported on the fixed member, the configuration can be made simpler and more compact.

According to a second embodiment of the present disclosure, the movable barrel may be extended forward in the light axis direction with respect to the support barrel when power is turned on.

Therefore, the length of the lens unit in the light axis direction when the power is turned on is longer, which allows imaging to be performed in a desired imaging state, so that user friendliness can be improved.

According to a third embodiment of the present disclosure, the first drive unit and the second drive unit may be arranged on an outer face side in the light axis direction of the support barrel in the fixed member.

Therefore, space can be utilized more effectively, and the blur correction apparatus can be made more compact.

According to a fourth embodiment of the present disclosure, the fixed member may be arranged in the outer housing.

Therefore, the fixed member does not protrude from the outer housing, so that the apparatus can be made substantially more compact.

According to a fifth embodiment of the present disclosure, the first drive unit and the second drive unit may be arranged on an outer face side of the lens unit in the light axis direction.

Therefore, since the first drive unit and the second drive unit are not present in the direction orthogonal to the light axis, the apparatus can be made more compact in the direction orthogonal to the light axis.

According to a sixth embodiment of the present disclosure, a supported portion may be provided at an edge portion on an object side of the support barrel. A support portion that supports the supported portion may be provided at an edge portion on an object side of the fixed member.

Therefore, a gap is less likely to form between the lens unit and the fixed member when the lens unit is turned, so that it is not necessary to provide a member to block the gap, the configuration can be simplified, and the entry of dust into the fixed member can be prevented. Further, when the movable barrel is protruding from the support barrel, the center of gravity of the lens unit is supported on the fixed member, so that a good balance for the lens unit with respect to gravity can be ensured, the lens unit can be turned with a small drive force, and the blur correction apparatus can be made more compact due to a reduction in the size of the drive unit.

According to a seventh embodiment of the present discloser, the fixed member may be positioned on an outer side of the lens unit. An inner side protrusion that protrudes inwards may be provided at a position that is further toward an image side than the support portion of the fixed member. A slanted face may be formed on an inner face of the inner side protrusion, the slanted face being father from a light axis with increase in a distance from the support portion.

Therefore, each of the parts can be arranged on the outer face side of the inner side protrusion, which allows the outer face side of the inner side protrusion to be utilized as an arrangement space, so that the blur correction apparatus can be made more compact.

According to an eighth embodiment of the present disclosure, the lens unit may be turnable using, as a supporting point, an axis orthogonal to the two axes.

Therefore, the lens unit can also be turned in the direction about the light axis, so that a blur correction operation can also be performed in the direction about the light axis, thereby enabling a substantial improvement in image quality to be achieved.

According to another embodiment of the present disclosure, there is provided an imaging apparatus including an image blur correction apparatus configured to include a lens unit that includes at least one lens and an outer housing that has the lens unit arranged therein. The lens unit is configured to correct image blur by being turnable in two different directions using, as supporting points, two axes that are orthogonal to the outer housing. The image blur correction apparatus includes a fixed member configured to turnably support the lens unit in the two directions, a first drive unit configured to be attached to the fixed member and configured to turn the lens unit in one of the two directions, and a second drive unit configured to be attached to the fixed member and configured to turn the lens unit in another of the two directions. The lens unit, which has a movable barrel configured to hold an optical element and configured to be turnable in a light axis direction, and a support barrel configured to movably support the movable barrel in the light axis direction, is extended and retracted by the movable barrel moving in the light axis direction. The support barrel is turnably supported by the fixed member in the two directions.

Therefore, in the blur correction apparatus, since the lens unit is turned in at least two different directions because the support barrel is supported on the fixed member, the configuration can be made simpler and more compact.

DETAILED DESCRIPTION OF THE EMBODIMENT(S)

Figure 1:
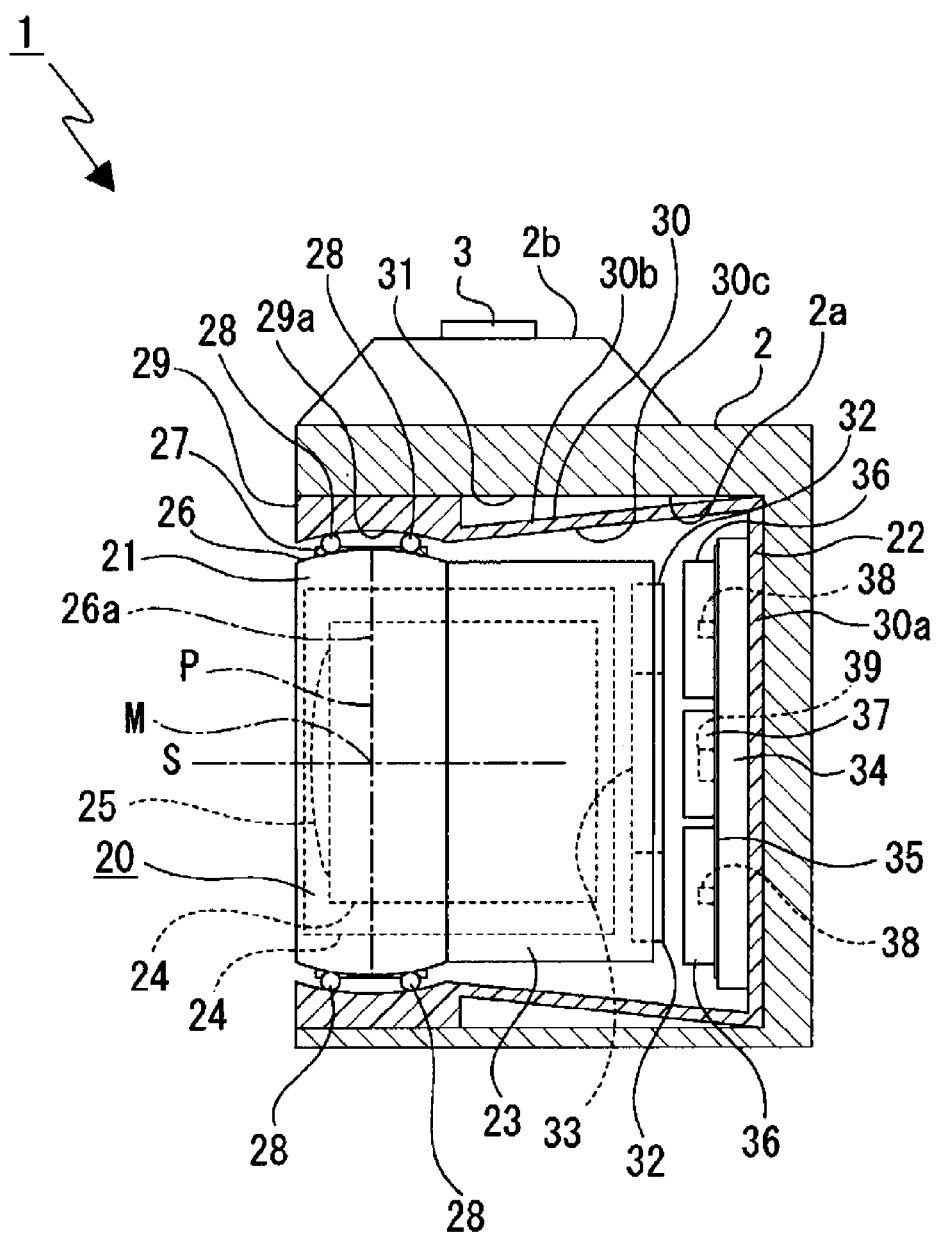
FIG. 1, which along with FIGS. 2 to 21 illustrates an image blur correction apparatus and an imaging apparatus, is a partial cross-sectional side view of an imaging apparatus illustrating a state in which a lens unit is stored.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

A best mode for implementing out the image blur correction apparatus and imaging apparatus according to an embodiment of the present technology will now be described with reference to the attached drawings.

The below-illustrated best mode applies the imaging apparatus according to an embodiment of the present technology in a still camera, and applies the image blur correction apparatus according to an embodiment of the present technology as an image blur correction apparatus provided in this still camera.

The applicable scope of the imaging apparatus and image blur correction apparatus according to an embodiment of the present technology is not limited, respectively, to a still camera and an image blur correction apparatus provided in a still camera. The imaging apparatus and image blur correction apparatus according to an embodiment of the present technology can be widely applied as an imaging apparatus incorporated in various devices, for example, a video camera, a mobile telephones, a personal computer and the like, or as an image blur correction apparatus provided in such an imaging apparatus.

In the following description, the front/rear, up/down (hereinafter "vertical"), and left/right (hereinafter, "horizontal") directions represent the directions as seen by the photographer when capturing an image with the still camera. Therefore, the object side becomes the front, and the photographer's side becomes the rear.

It is noted that the front/rear, vertical, and horizontal directions mentioned below are to facilitate the description. The present technology is not limited to these directions.

Further, the lens illustrated below can mean either a lens configured from a single lens, or a lens that is configured as a lens group by a plurality of lenses.

[Overall Configuration of the Imaging Apparatus]

Figure 2:
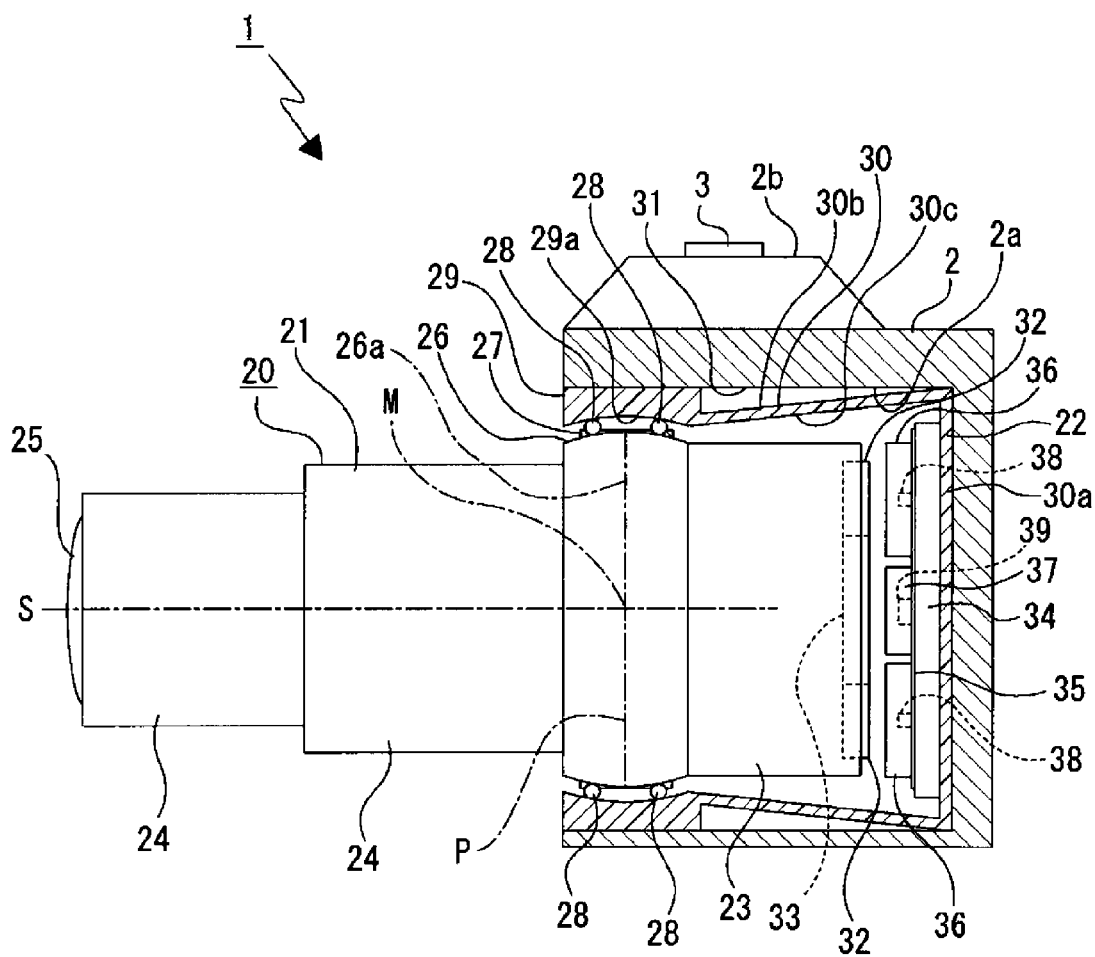
FIG. 2 is a partial cross-sectional side view of an imaging apparatus illustrating a state in which a lens unit is protruding.
Figure 3:
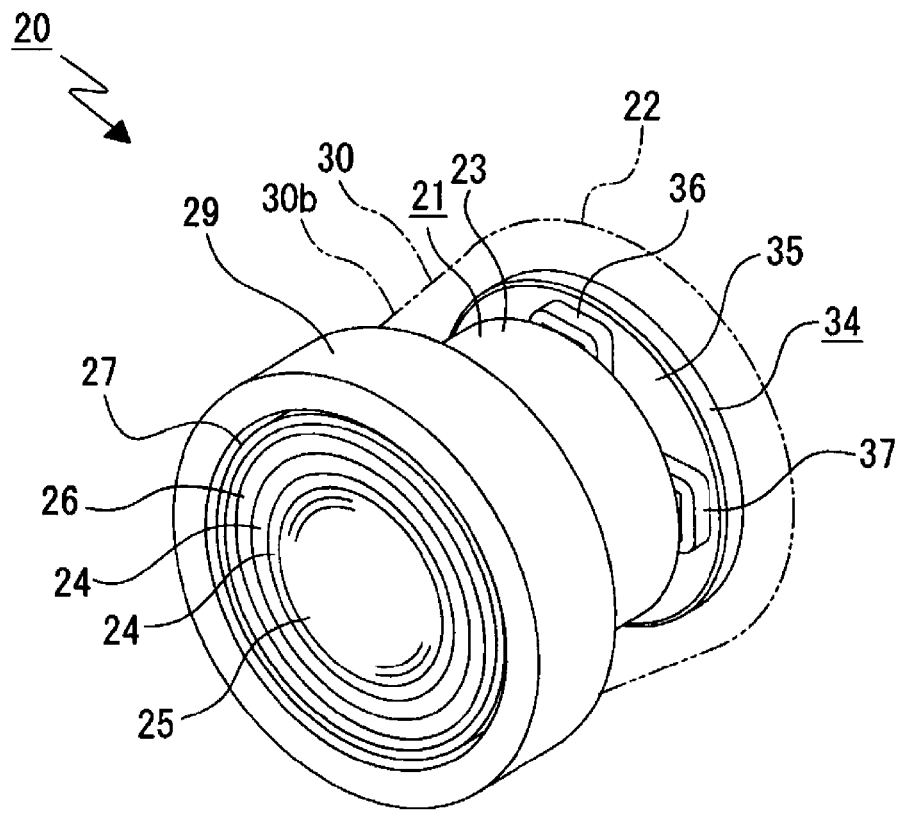
FIG. 3, which along with FIGS. 4 to 11 illustrates an image blur correction apparatus according to a first embodiment of the present technology, is a perspective view of an image blur correction apparatus.
Figure 4:
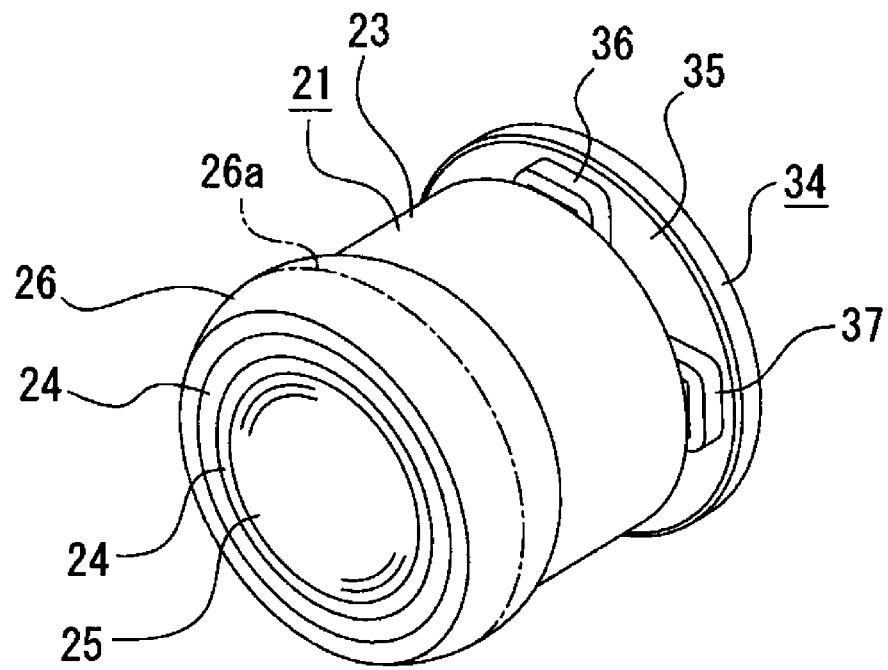
FIG. 4 is a perspective view of an image blur correction apparatus shown with a fixed member and a sphere holding frame omitted.
Figure 5:
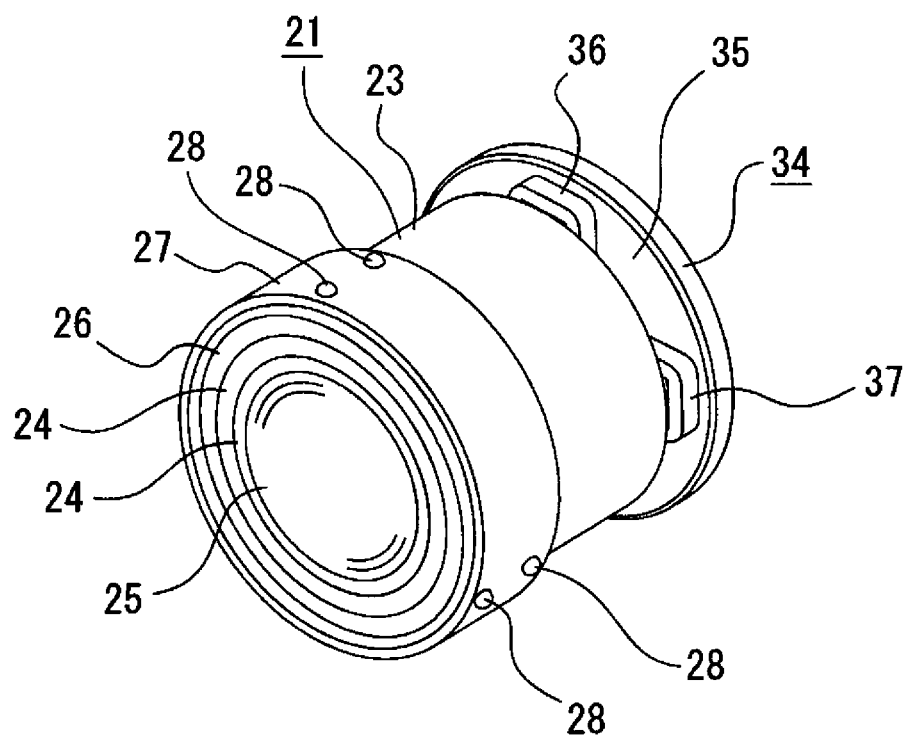
FIG. 5 is a perspective view of an image blur correction apparatus shown with a sphere holding frame omitted.
Figure 6:
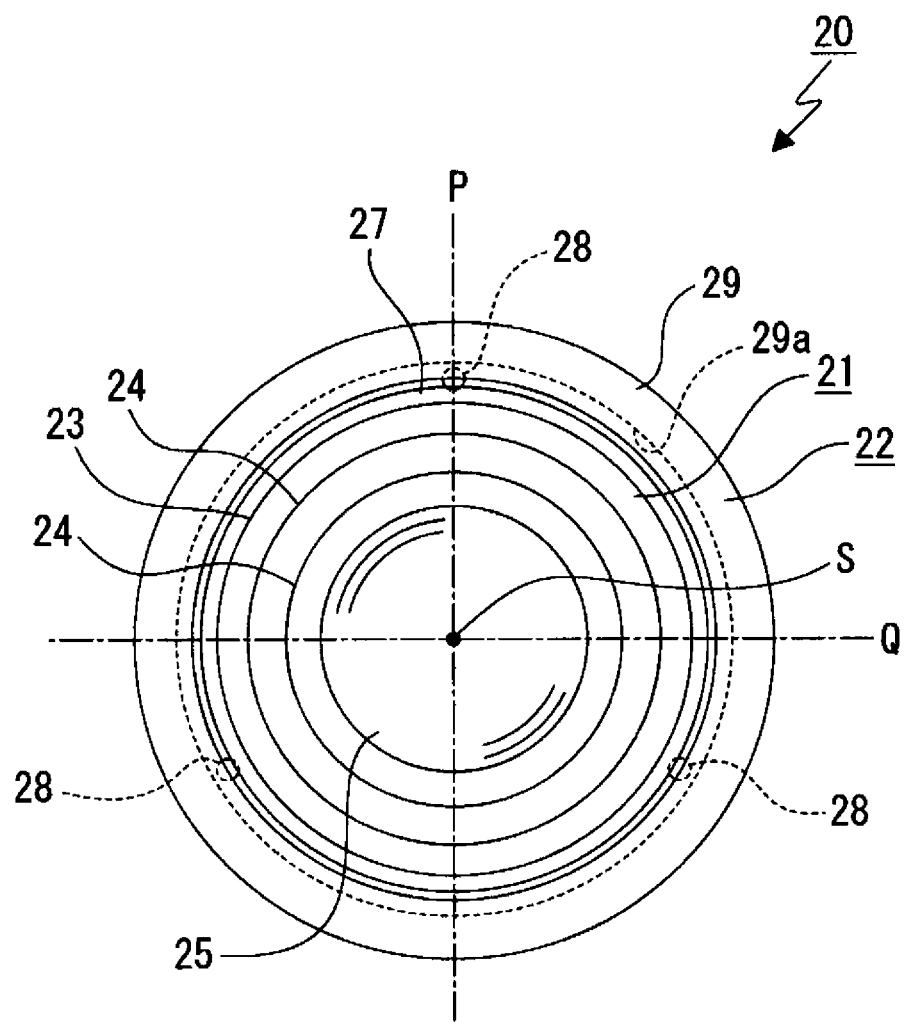
FIG. 6 is a front view of an image blur correction apparatus.

An imaging apparatus 1 has various parts arranged in and externally to an outer housing 2 (refer to FIGS. 1 and 2). The imaging apparatus 1 is a so-called retractable apparatus in which a below-described lens unit is capable of extending and retracting in the light axis direction.

The outer housing 2 is formed in the shape of a casing that is open to the front, in which an inner portion is formed as an arrangement space 2a.

Various operating buttons 3, 3 . . . are arranged on an outer face 2b of the outer housing 2 (in FIG. 1 only one button is shown). As the operating buttons 3, 3, . . . , for example, a power button, a zoom lever, an imaging button, an image playback button, a mode switching button and the like are arranged.

A (not illustrated) display unit is provided on a rear face portion of the outer housing 2.

Configuration of the Image Blur Correction Apparatus

First Embodiment

First, the configuration of an image blur correction apparatus according to a first embodiment of the present technology will be described (refer to FIGS. 1 to 7).

An image blur correction apparatus 20 is arranged in the arrangement space 2a of the outer housing 2 (refer to FIG. 1). The image blur correction apparatus 20 has a lens unit 21 and a fixed member 22 that supports the lens unit 21 (refer to FIGS. 1 to 6).

The lens unit 21 is formed in, for example, a roughly cylindrical shape that extends in a light axis direction. The lens unit 21 has a support barrel 23 and a plurality of, for example two, movable barrels 24 and 24 that can move in the light axis direction with respect to the support barrel 23. It is noted that the number of movable barrels 24 is not limited to two, one may be provided or three or more may be provided.

The support barrel 23 and the movable barrels 24 and 24 are all configured so that the light axis direction is the axis direction. The support barrel 23 and the movable barrels 24 and 24 are arranged in order from the outer periphery side. One of the movable barrels 24 is movably supported on the support barrel 23 in the light axis direction, and the other movable barrel 24 is movably supported on the first movable barrel 24 in the light axis direction. The movable barrels 24 and 24 are extended forward in the light axis direction with respect to the support barrel 23 when the power to the imaging apparatus 1 is turned on.

A plurality of lenses or a lens group arrayed in a light axis direction is provided in the lens unit 21. An imaging lens 25, called a "front lens", is arranged on a front edge portion of the movable barrel 24 that is arranged on the inner-most periphery side.

The lens unit 21 can be extended/retracted by the movable barrels 24 and 24 being moved in the light axis direction with respect to the support barrel 23. The lens unit 21 is extended/retracted between a storage state (refer to FIG. 1), in which the whole unit is stored inside the outer housing 2, and a protruding state (refer to FIG. 2), in which the movable barrels 24 and 24 protrude forward to the maximum movement range.

A spherically-shaped supported portion 26, which has a diameter greater than the other outer peripheries, is provided on a front edge portion of the support barrel 23 (refer to FIGS. 1, 2, 4, and 6). The supported portion 26 is formed in the shape of a sphere around a reference point M, which is a point in the lens unit 21. The reference point M is, for example, positioned on the light axis S.

A sphere holding frame 27 is attached to the supported portion 26. The sphere holding frame 27 is formed in a roughly circular shape. The inner periphery of the sphere holding frame 27 is formed in a spherical shape that has the same curvature as the supported portion 26. When attached to the supported portion 26, the inner periphery of the sphere holding frame 27 is in close contact with the supported portion 26.

Concave insertion portions 27a, 27a, ..., which are spaced apart in the circumferential direction, are open in the radial direction, and have a roughly hemispherical shape, are formed on the sphere holding frame 27. The concave insertion portions 27a, 27a, ... are, for example, formed in groups of three at the front edge portion and the rear edge portion, respectively, and are positioned, for example, in equal intervals in the circumferential direction.

Spheres 28, 28, ... are respectively inserted in a rotatable state in the concave insertion portions 27a, 27a, ... of the sphere holding frame 27. About half of the spheres 28 protrudes from the concave insertion portions 27a when the spheres 28 have been inserted into the concave insertion portions 27a.

At least one, and for example three, spheres 28, 28, ... are positioned in the light axis direction (front/rear direction) on either side, respectively, of the outermost periphery of the supported portion 26, i.e., sandwiching a center line 26a in the front/rear direction of the supported portion 26. The spheres 28, 28, ... are positioned so that, for example, pairs of two spheres are each spaced apart in the front/back direction, thereby making a total of six spheres that are provided.

The fixed member 22 is configured from a support portion 29 that is formed in a roughly circular shape that is slightly larger than the sphere holding frame 27, and an arrangement portion 30 that is concatenated with the rear side of the support portion 29.

The support portion 29 is arranged on the outer periphery side of the sphere holding frame 27, and its inner periphery is formed as a spherical support face 29a about the reference point M.

The arrangement portion 30 is configured from an attachment face portion 30a that faces the front/rear direction, and an inner side protrusion 30b that protrudes roughly toward the front from an outer periphery portion of the attachment face portion 30a. The inner side protrusion 30b is formed as a slanted face 30c that protrudes inwards and is gently slanted so that its inner periphery is displaced more and more inwards. The slanted face 30c is formed so as to move further and further away from the light axis going from the support portion 29 to the rear.

The arrangement portion 30 is configured so that the front edge portion of the inner side protrusion 30b is concatenated with the rear edge portion of the support portion 29.

Since the fixed member 22 is configured so that the outer periphery of the support portion 29 and the attachment face portion 30a of the arrangement portion 30 are in close contact with the front edge portion of the inner periphery of the outer housing 2 and the front face of the rear edge portion, respectively, and so that the slanted face 30c is gently slanted so that its inner periphery is displaced more and more inwards, a circular space 31 is formed between the inner side protrusion 30b and the outer housing 2. The various parts for the imaging apparatus 1 are arranged in the space 31.

Figure 7:
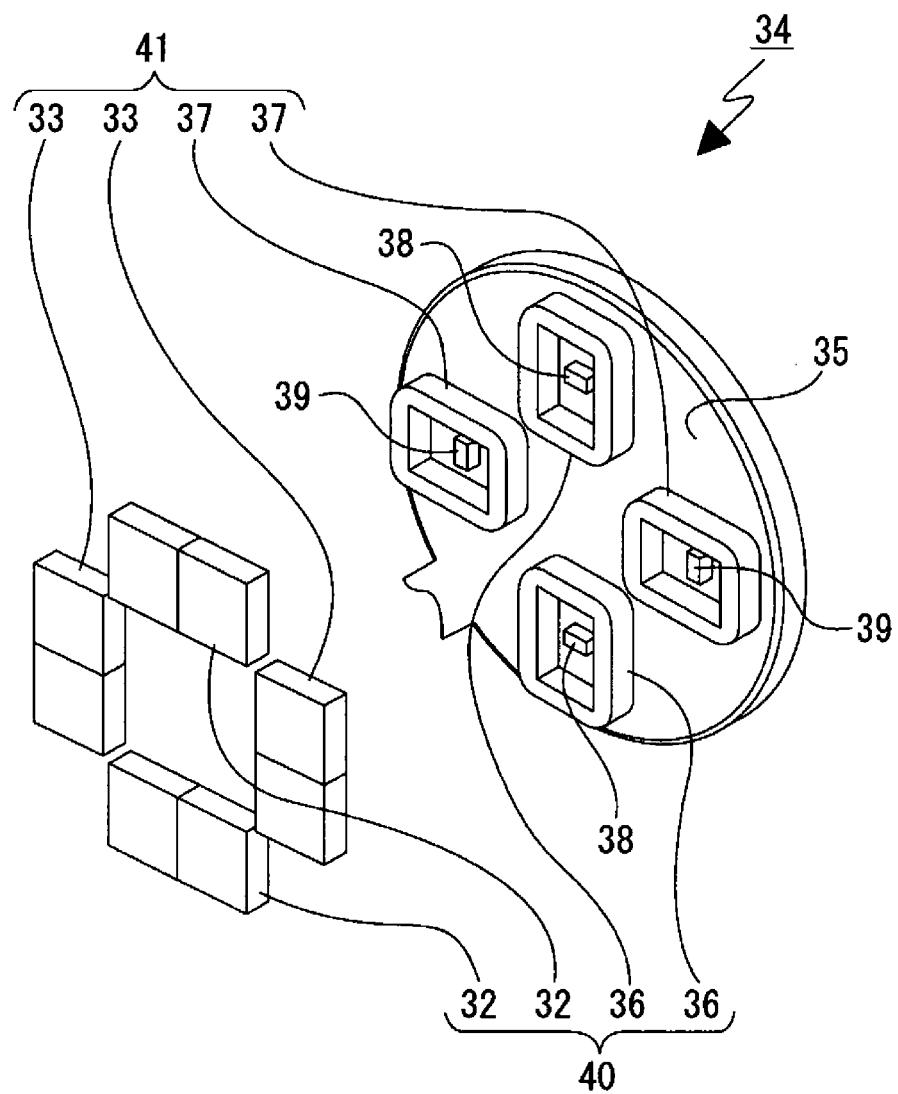
FIG. 7 is an exploded perspective view of a turning actuator.

First drive magnets 32 and 32 and second drive magnets 33 and 33 are attached to the rear face of the lens unit 21 (refer to FIGS. 1, 2 and 7). The first drive magnets 32 and 32 are vertically positioned sandwiching the light axis, and are magnetized so that the N pole and the S pole are in the horizontal direction. The second drive magnets 33 and 33 are horizontally positioned sandwiching the light axis, and are magnetized so that the N pole and the S pole are in the vertical direction.

A turning actuator 34 is arranged on the rear face side of the lens unit 21. The turning actuator 34 is configured so as to include the first drive magnets 32 and 32 and the second drive magnets 33 and 33.

A circular substrate 35, for example, facing in the front/rear direction is provided on the turning actuator 34. First drive coils 36 and 36 and second drive coils 37 and 37 are attached to the front face of the substrate 35. The first drive coils 36 and 36 are vertically positioned sandwiching the light axis S, and the second drive coils 37 and 37 are horizontally positioned sandwiching the light axis S.

First detection units 38 and 38 are arranged in a center portion of the first drive coils 36 and 36, respectively, and second detection units 39 and 39 are arranged in a center portion of the second drive coils 37 and 37, respectively.

In the thus-configured lens unit 21 and fixed member 22, the lens unit 21 is turnably supported on the fixed member 22 via the spheres 28, 28, . . . (refer to FIGS. 1 to 3). When the lens unit 21 is supported on the fixed member 22, the support face 29a is in contact with the spheres 28, 28, . . . , and the lens unit 21 is turned via the spheres 28, 28, . . . . Therefore, the supported portion 26 of the lens unit 21 slides along the support face 29a of the fixed member 22 via the spheres 28, 28, . . . .

The lens unit 21 can be turned with respect to the fixed member 22 in a first direction (yaw direction) about a first supporting axis P that is orthogonal to the light axis S and vertically extends through the reference point M, and in a second direction (pitch direction) about a second supporting axis Q that is orthogonal to the light axis S and the first supporting axis P, and horizontally extends through the reference point M. Further, the lens unit 21 can also be turned in the direction about the light axis (roll direction), which is a third direction.

The first drive magnets 27 and 27 attached to the lens unit 21 and the first drive coils 31 and 31 are respectively positioned facing the front/rear direction. A first drive unit 35 that turns the lens unit 21 in the first direction or the third direction is configured from the first drive magnets 27 and 27 and the first drive coils 31 and 31. In the first drive unit 35, one of the first drive magnets 27 and one of the first drive coils 31 act as a first thrust generation unit that imparts on the lens unit 21a turning force (thrust) in the first direction or the third direction. Further, the other first drive magnet 27 and the other first drive coil 31 also act as a first thrust generation unit that imparts on the lens unit 21 a turning force (thrust) in the first direction or the third direction.

On the other hand, the second drive magnets 33 and 33 attached to the lens unit 21 and the second drive coils 37 and 37 are respectively positioned facing the front/rear direction. A second drive unit 41 that turns the lens unit 21 in the second direction or the third direction is configured from the second drive magnets 33 and 33 and the second drive coils 37 and 37.

The turning actuator 34 is configured so that a substrate 35 is attached to an inner face of the attachment face portion 30a of the fixed member 22, and the first second drive unit 40 and the second drive unit 41 are arranged on an outer face side of the support barrel 23 inside the fixed member 22.

It is noted that an example was described above in which the first drive magnets 32 and 32 and the first drive coils 36 and 36 of the first drive unit 40 are positioned vertically spaced apart, and the second drive magnets 33 and 33 and the second drive coils 37 and 37 of the second drive unit 41 are positioned horizontally spaced apart. However, the first drive magnets 32 and 32 and the first drive coils 36 and 36 of the first drive unit 40 may be positioned horizontally spaced apart, and the second drive magnets 33 and 33 and the second drive coils 37 and 37 of the second drive unit 41 may be positioned vertically spaced apart.

Further, although an example was described above in which the first drive magnets 32 and 32 and the second drive magnets 33 and 33 are arranged in the lens unit 21, and the first drive coils 36 and 36 and the second drive coils 37 and 37 are arranged on the substrate 35, conversely, the drive coils may be arranged on the lens unit 21 and the drive magnets may be arranged on the substrate 35.

Operation of the Image Blur Correction Apparatus

First Embodiment

The blur correction operation performed in the image blur correction apparatus 20 will now be described.

In a state before the blur correction operation is carried out, the image blur correction apparatus 20 is at a reference position where there has been no turning in the first direction, the second direction, or the third direction (refer to FIGS. 1 and 2).

Figure 8:
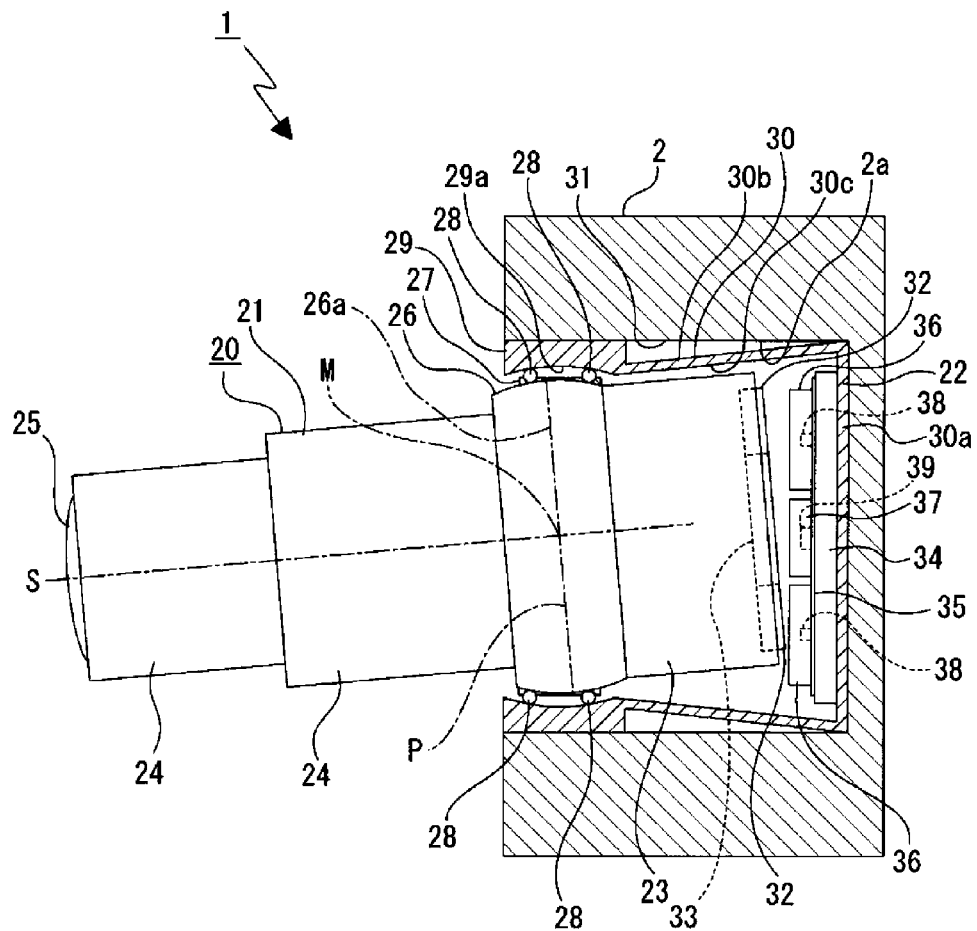
FIG. 8, which along with FIG. 9 illustrates operation of an image blur correction apparatus, is a partial cross-sectional side view illustrating a state in which a lens unit has been turned in a first direction.

In the image blur correction apparatus 20, when power is supplied to the first drive coils 36 and 36 of the first drive unit 40 so that, for example, thrust is produced in the same direction, a blur correction operation is carried out by the lens unit 21 being turned in the first direction about the first supporting axis P (refer to FIG. 8). At this stage, the spheres 28, 28, . . . roll along the fixed member 22 in conjunction with the turning of the lens unit 21, whereby the blur correction operation of the lens unit 21 is smoothly carried out. In a state in which the lens unit 21 has been turned as far as turning will go in the first direction, the outer periphery of the support barrel 23 is roughly parallel to the slanted face 30c formed on the inner side protrusion 30b of the fixed member 22.

Figure 9:
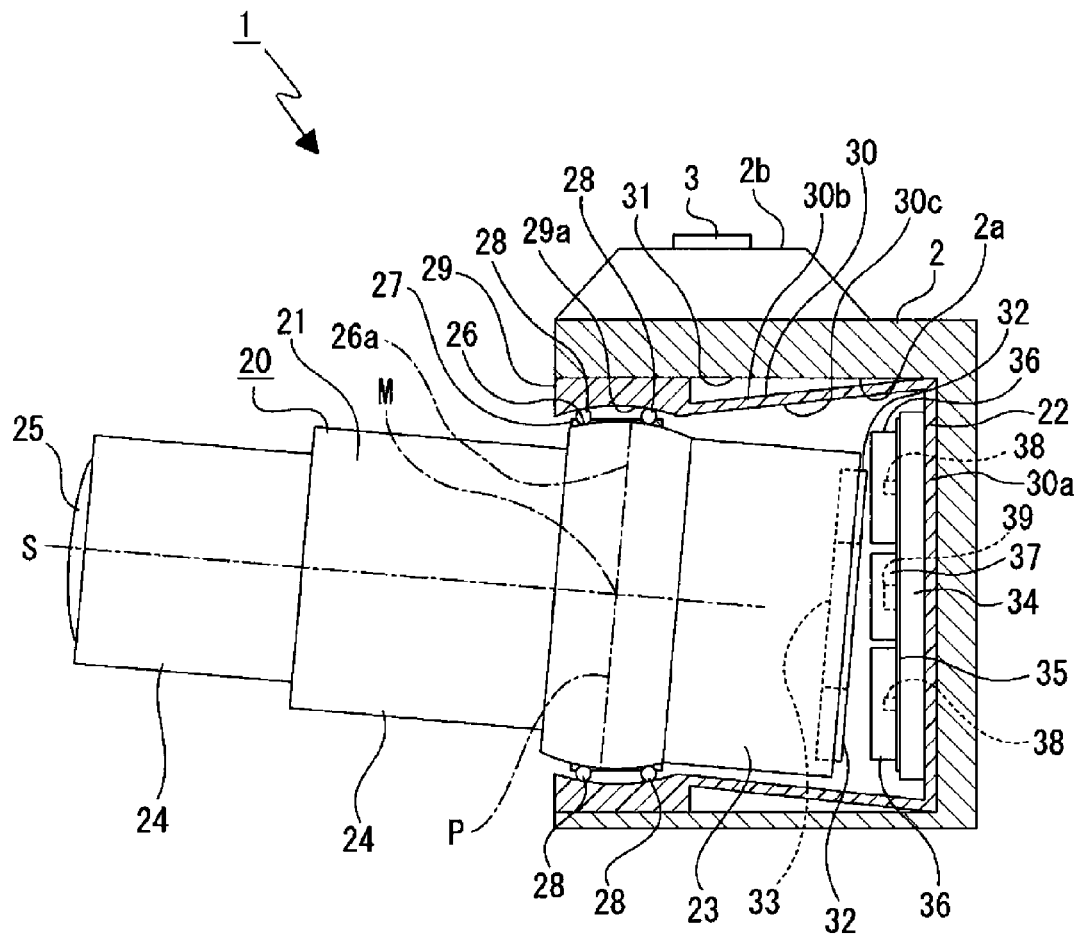
FIG. 9 is a partial cross-sectional side view illustrating a state in which a lens unit has been turned in a second direction.

On the other hand, when power is supplied to the second drive coils 37 and 37 of the second drive unit 41 so that, for example, thrust is produced in the same direction, a blur correction operation is carried out by the lens unit 21 being turned in the second direction about the second supporting axis Q (refer to FIG. 9). At this stage, the spheres 28, 28, . . . roll along the fixed member 22 in conjunction with the turning of the lens unit 21, whereby the blur correction operation of the lens unit 21 is smoothly carried out. In a state in which the lens unit 21 has been turned as far as turning will go in the second direction, the outer periphery of the support barrel 23 is roughly parallel to the slanted face 30c formed on the inner side protrusion 30b of the fixed member 22.

Figure 10:
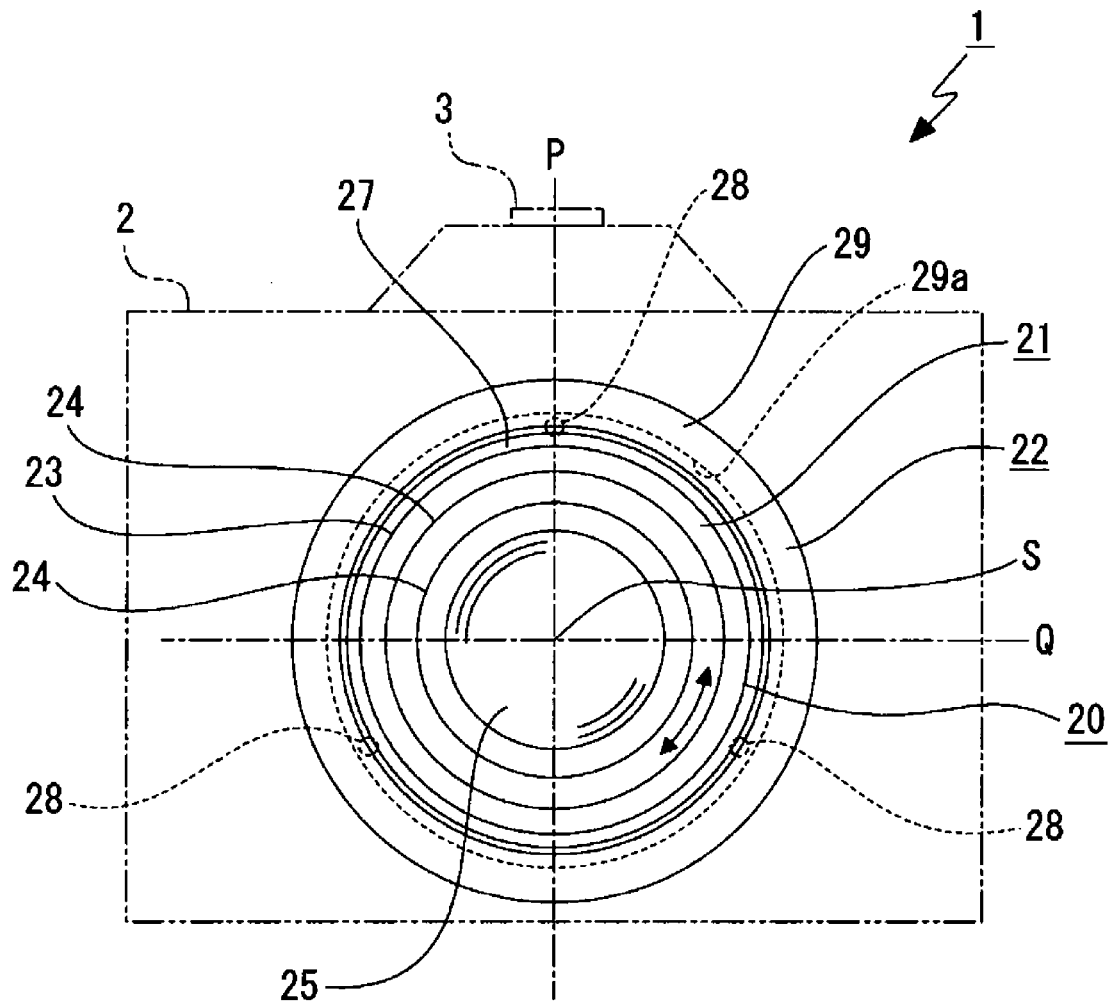
FIG. 10 is a front view illustrating a state in which a lens unit has been turned in a third direction.

Further, when power is supplied to the first drive coils 36 and 36 of the first drive unit 40 so that, for example, thrust is produced in different directions, and power is supplied to the second drive coils 37 and 37 of the second drive unit 41 so that, for example, thrust is produced in different directions, a blur correction operation is carried out by the lens unit 21 being turned in the third direction (refer to FIG. 10). It is noted that even when the supply of power to the first drive coils 36 and 36 of the first drive unit 40 so that, for example, thrust is produced in different directions, and the supply of power to the second drive coils 37 and 37 of the second drive unit 41 so that, for example, thrust is produced in different directions, is carried out simultaneously, the lens unit 21 can turn in the third direction. At this stage, the spheres 28, 28, . . . roll along the fixed member 22 in conjunction with the turning of the lens unit 21, whereby the blur correction operation of the lens unit 21 is smoothly carried out.

During the above blur correction operation, the position of the lens unit 21 in the first direction is continuously detected by detecting changes in the magnetic field of the first drive magnets 32 and 32 with the first detection units 38 and 38, and the position of the lens unit 21 in the second direction is continuously detected by detecting changes in the magnetic field of the second drive magnets 33 and 33 with the second detection units 39 and 39. Simultaneously with this, the position of the lens unit 21 in the third direction is continually detected by the first detection units 38 and 38 or the second detection units 39 and 39, or both of these.

As described above, in the image blur correction apparatus 20, the inner side protrusion 30b is provided in the fixed member 22, and the slanted face 30c is formed on the inner side protrusion 30b that slants further and further away from the light axis going from the support portion 29.

Therefore, various parts can be arranged in the space 31, so that the space 31 can be utilized as an arrangement space, which allows the image blur correction apparatus 20 to be made more compact. Further, since the lens unit 21 can be turned about the light axis, which is orthogonal to both the first axis and the second axis, the lens unit 21 can also be turned in the direction about the light axis direction, which is a third direction. Consequently, a blur correction operation can also be performed in the direction about the light axis, so that a substantial improvement in image quality can be achieved.

Other Examples

Figure 11:
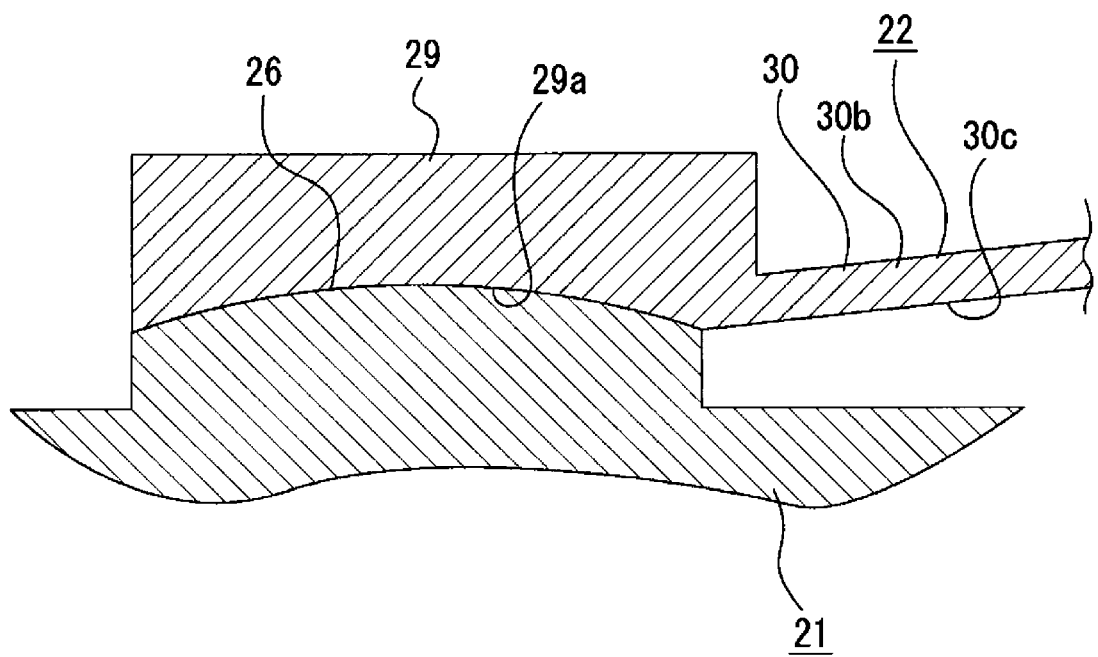
FIG. 11 is a cross-sectional view illustrating an example in which a lens unit is supported on a fixed member with no spheres provided.

Although an example was described above in which the lens unit 21 is turnably supported on the fixed member 22 via the spheres 28, 28, . . . , the lens unit 21 can also be turnably supported on the fixed member 22 without providing the spheres 28, 28, . . . (refer to FIG. 11). In this case, the supported portion 26 of the lens unit 21 and the support face 29a of the fixed member 22 are formed in a spherical shape having the same curvature, and when these two parts are brought close together, and the lens unit 21 is turned, the supported portion 26 slides along the support face 29a.

Thus, the number of parts can be reduced and the apparatus can be made more compact by enabling the lens unit 21 to turn without the use of spheres 28, 28, . . . .

Configuration of the Image Blur Correction Apparatus

Second Embodiment

Next, a configuration of an image blur correction apparatus according to a second embodiment of the present technology will be described (refer to FIGS. 12 to 20).

Figure 12:
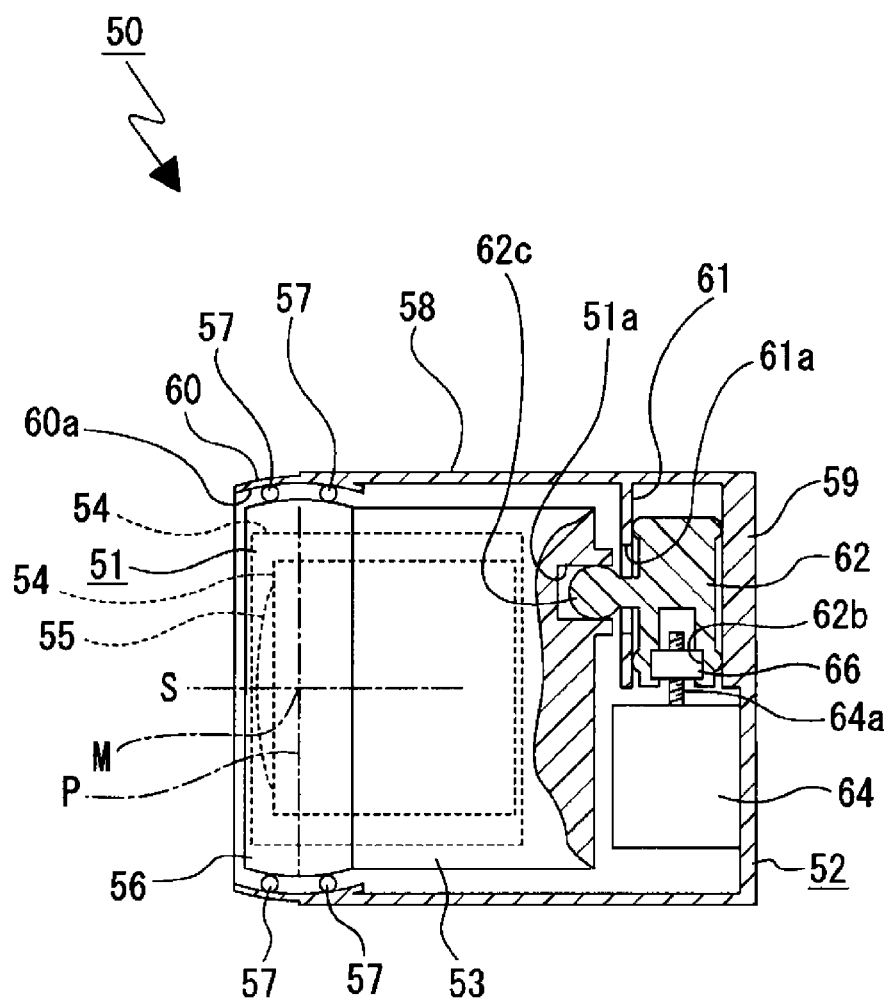
FIG. 12, which along with FIGS. 13 to 20 illustrates an image blur correction apparatus according to a second embodiment of the present technology, is a partial cross-sectional side view of an image blur correction apparatus.

An image blur correction apparatus 50 is arranged inside the outer housing 2 (refer to FIG. 12). The image blur correction apparatus 50 has a lens unit 51 and a fixed member 52 that supports the lens unit 21 (refer to FIGS. 13 to 15).

The lens unit 51 is formed in, for example, a roughly cylindrical shape that extends in a light axis direction. The lens unit 51 has a support barrel 53 and a plurality of, for example two, movable barrels 54 and 54 that can move in the light axis direction with respect to the support barrel 53. It is noted that the number of movable barrels 54 is not limited to two, one may be provided or three or more may be provided.

The support barrel 53 and the movable barrels 54 and 54 are all configured so that the light axis direction is the axis direction. The support barrel 53 and the movable barrels 54 and 54 are arranged in order from the outer periphery side. One of the movable barrels 54 is movably supported on the support barrel 23 in the light axis direction, and the other movable barrel 54 is movably supported on the first movable barrel 54 in the light axis direction. The movable barrels 54 and 54 are extended forward in the light axis direction with respect to the support barrel 53 when the power to the imaging apparatus 1 is turned on.

A plurality of lenses or a lens group arrayed in a light axis direction is provided in the lens unit 51. An imaging lens 55, called a "front lens", is arranged on a front edge portion of the movable barrel 54 that is arranged on the inner-most periphery side.

The lens unit 51 can be extended/retracted by the movable barrels 54 and 54 being moved in the light axis direction with respect to the support barrel 53. The lens unit 51 is extended/retracted between a storage state (refer to FIG. 12), in which the whole unit is stored inside the outer housing 2, and a protruding state (refer to FIG. 13), in which the movable barrels 54 and 54 protrude forward to the maximum forward movement range.

A spherically-shaped supported portion 56, which has a diameter greater than the other outer peripheries, is provided on an outer periphery of a front edge portion of the support barrel 53. The supported portion 56 is formed in the shape of a sphere around a reference point M, which is a point in the lens unit 51. The reference point M is, for example, positioned on the light axis S.

A spherically-shaped supported portion 56, which has a diameter greater than the other outer peripheries, is provided on an outer periphery of a front edge portion of the support barrel 53 (refer to FIG. 12). The supported portion 56 is formed in the shape of a sphere around a reference point M, which is a point in the lens unit 21. The reference point M is, for example, positioned on the light axis S.

On the supported portion 56, spheres 57, 57, . . . are respectively arranged spaced apart in the front/rear direction in a rotatable state. The spheres 57, 57, . . . , which are for example arranged spaced apart in the front/rear direction, are provided in pairs spaced apart in the circumferential direction.

A concave coupling portion 51a open to the rear is formed on the rear face of the lens unit 51.

The fixed member 52 has a roughly cylindrical storage portion 58, and a holding portion 59 that is provided at a rear side of the storage portion 58.

A roughly circular support portion 60 is provided at a front edge portion of the storage portion 58. An inner periphery of the support portion 60 is formed as a spherical support face 60a around the above-described reference point M.

The holding portion 59, which is formed in a box shape that is open at the front, is provided at a front edge portion with a batten portion 61 that faces the front/rear direction. An insertion hole 61a is formed on the batten portion 61.

The lens unit 21 is turnably supported on the fixed member 52 via the spheres 57, 57, . . . . When the lens unit 51 is supported on the fixed member 52, the support face 60a of the support portion 60 is in contact with the spheres 57, 57, . . . , and the lens unit 51 is turned via the spheres 57, 57, . . . .

It is noted that a (not illustrated) falling prevention portion that prevents the spheres 57, 57, . . . from falling out from between the support face 60a and the supported portion 56 is provided on the lens unit 51 or the fixed member 52.

The lens unit 51 can be turned with respect to the fixed member 52 in a first direction (yaw direction) about a first axis that is orthogonal to the light axis and vertically extends through the reference point M, and in a second direction (pitch direction) about a second axis that is orthogonal to the light axis and the first support axis, and horizontally extends through the reference point M.

A coupling member 62 is movably supported in the horizontal direction and the vertical direction on the holding portion 59 of the fixed member 52. The coupling member 62 can move in the horizontal direction and the vertical direction when the coupling member 62 is held from the front/rear direction by a rear face portion of the holding portion 59 and the batten portion 61.

A first tolerance portion 62a that has a groove shape extending vertically and a second tolerance portion 62b that has a groove shape extending horizontally are formed on the coupling member 62. A coupling portion 62c that protrudes toward the front and has a spherically formed tip portion is provided on the coupling member 62.

The coupling portion 62c of the coupling member 62 is inserted through the insertion hole 61a of the batten portion 61 and through the concave coupling portion 51a, thereby being coupled to the lens unit 51. The tip portion of the coupling portion 62c is formed in a spherical shape, so that the coupling portion 62c is relatively rotated when the lens unit 51 is turned.

A first drive unit 63 and a second drive unit 64 are attached inside the holding portion 59 of the fixed member 52. The first drive unit 63 and the second drive unit 64 are arranged on the outer face side of the support barrel 53. As the first drive unit 63 and the second drive unit 64, a stepping motor may be used, for example.

The first drive unit 63 is arranged to the side of the coupling member 62, and a motor shaft 63a formed with a spiral groove extends in a horizontal direction. A first movement member 65 used by a nut member is screwed on the motor shaft 63a, for example. The first movement member 65 is formed in a prismatic shape, for example. The first tolerance portion 62a of the coupling member 62 is slidably supported in a vertical direction on the first movement member 65. The first movement member 65 does not rotate with respect to the first tolerance portion 62a.

The second drive unit 64 is arranged above or below the coupling member 62, and a motor shaft 64a formed with a spiral groove extends in a vertical direction. A second movement member 66 used by a nut member is screwed on the motor shaft 64a, for example. The second movement member 66 is formed in a prismatic shape, for example. The second tolerance portion 62b of the coupling member 62 is slidably supported in a horizontal direction on the second movement member 66. The second movement member 66 does not rotate with respect to the second tolerance portion 62b.

A biasing spring 67 is supported between the coupling member 62 and the holding portion 59 of the fixed member 52. The coupling member 62 is biased by the biasing spring 67 in a direction between the axis direction of the first axis and the axis direction of the second axis.

It is noted that even in the fixed member 52 of the image blur correction apparatus 50, similar to the fixed member 22 of the image blur correction apparatus 20, an inner side protrusion may be formed as a slanted face whose inner periphery is displaced more and more inwards, and a space for arranging the various parts may be formed between the inner side protrusion and the outer housing 2.

Operation of the Image Blur Correction Apparatus

Second Embodiment

The blur correction operation performed in the image blur correction apparatus 50 will now be described (refer to FIGS. 13 to 20).

Figure 13:
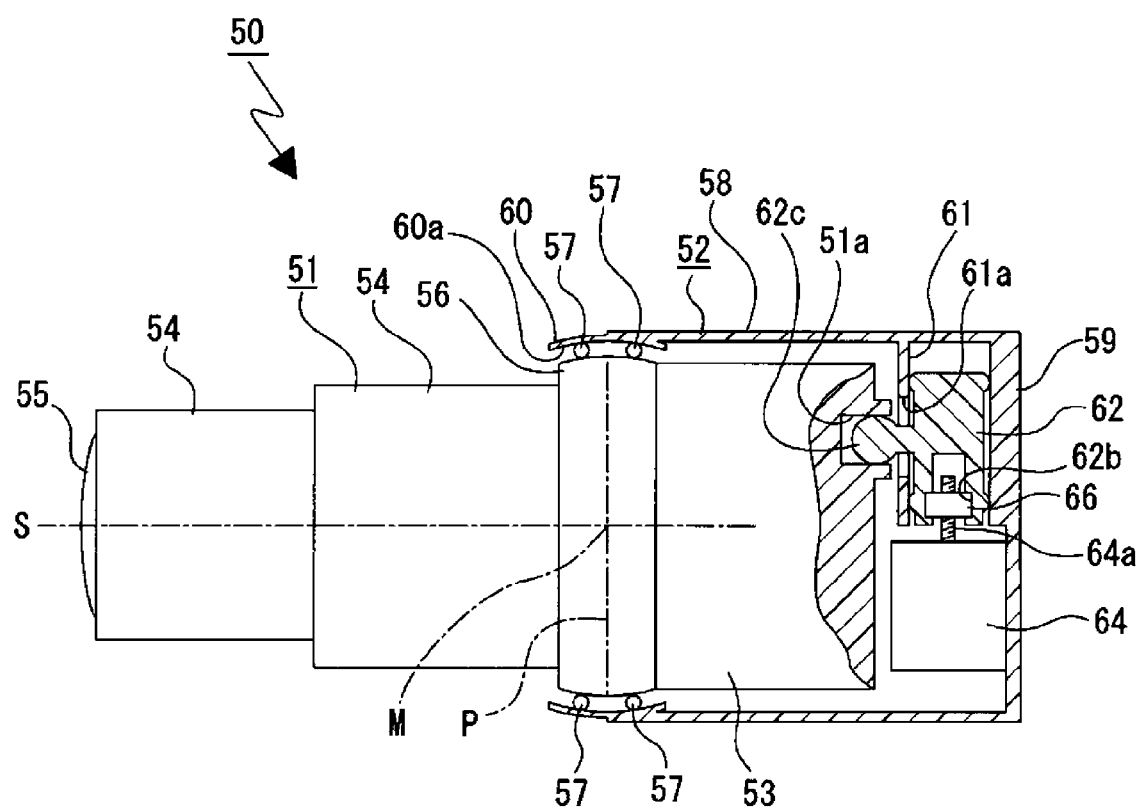
FIG. 13, which along with FIGS. 14 to 20 illustrates operation of an image blur correction apparatus, is a partial cross-sectional side view illustrating a state in which a lens unit is at a reference position.
Figure 14:
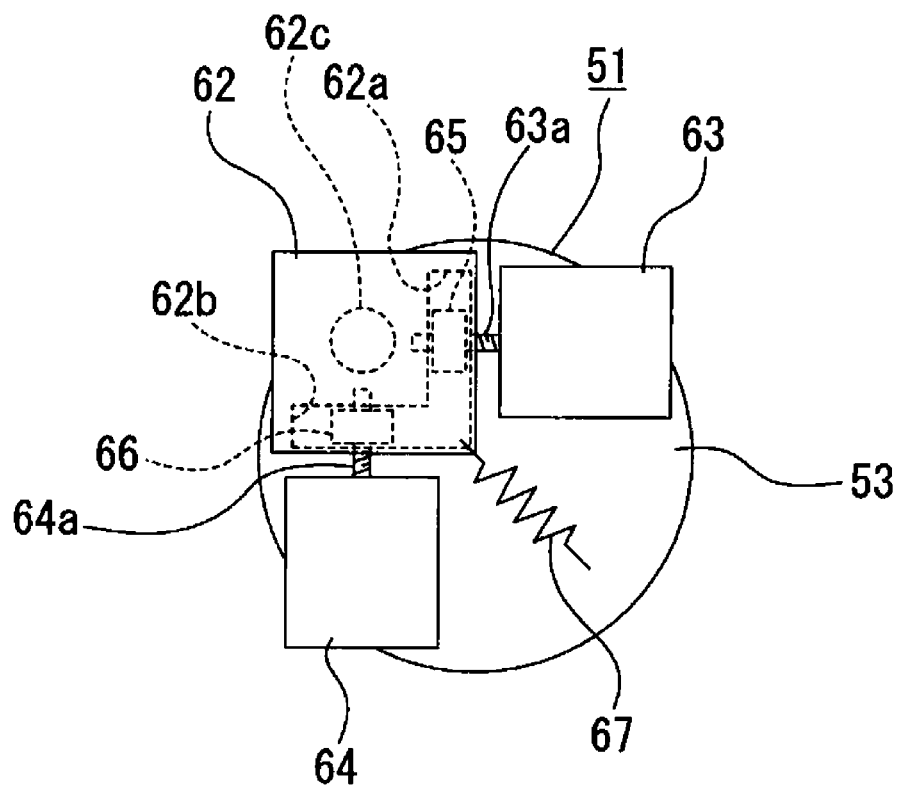
FIG. 14 is a rear view illustrating a state in which a lens unit is at a reference position.
Figure 15:
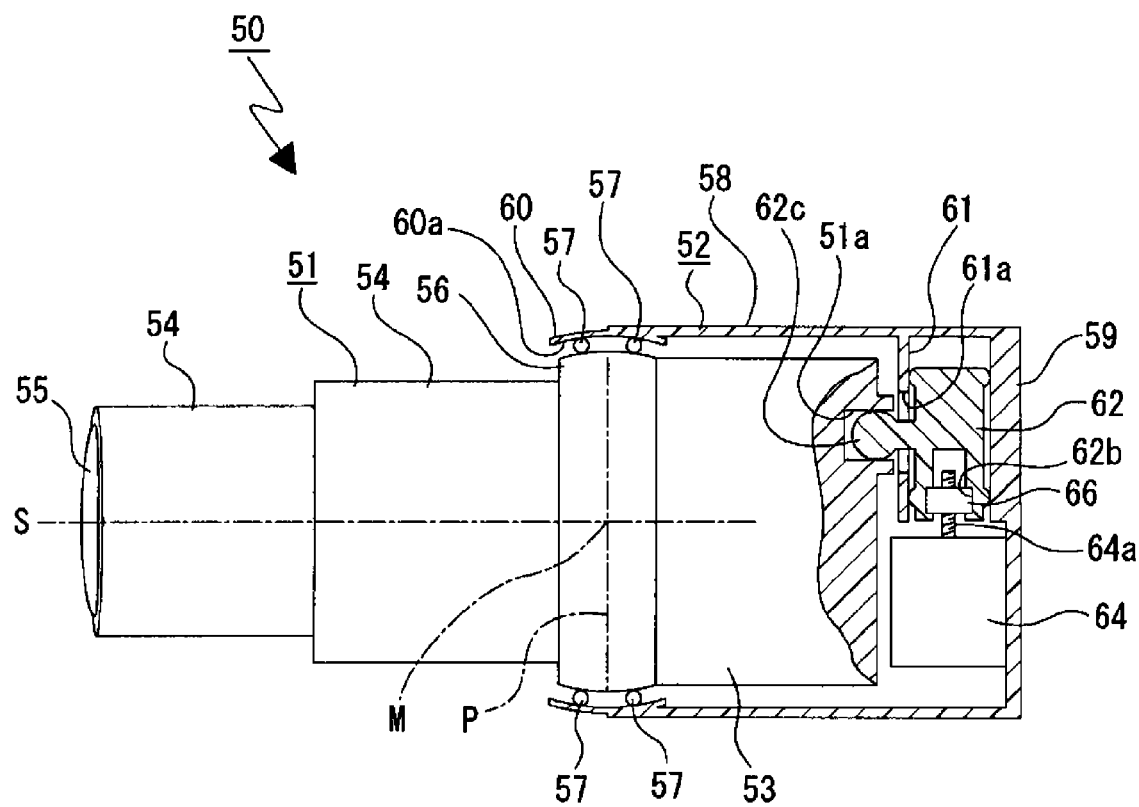
FIG. 15 is a partial cross-sectional side view illustrating a state in which a lens unit has been turned in a first direction.
Figure 16:
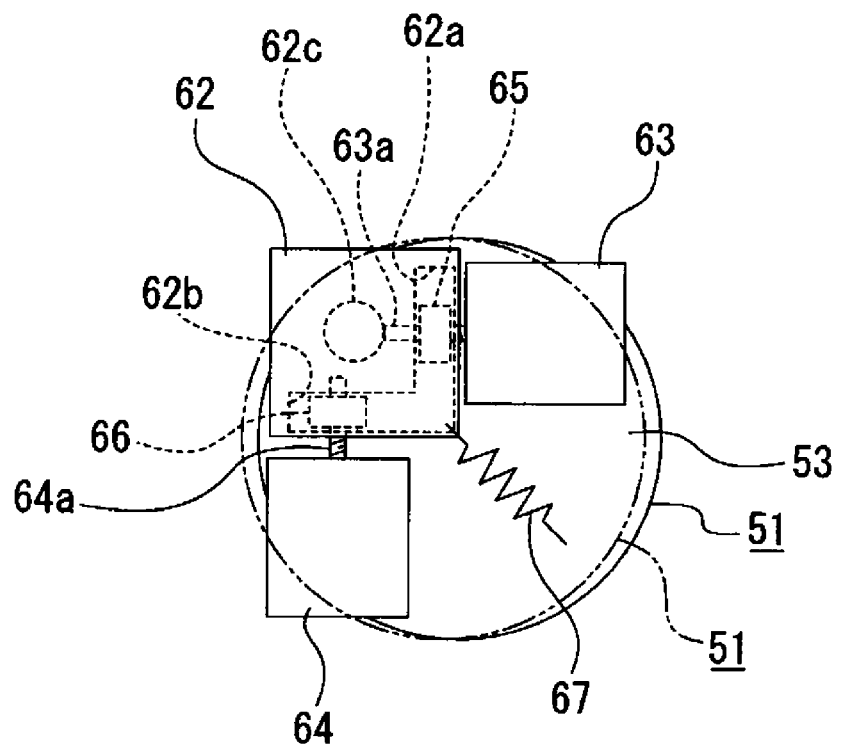
FIG. 16 is a rear view illustrating a state in which a lens unit has been turned in a first direction.
Figure 17:
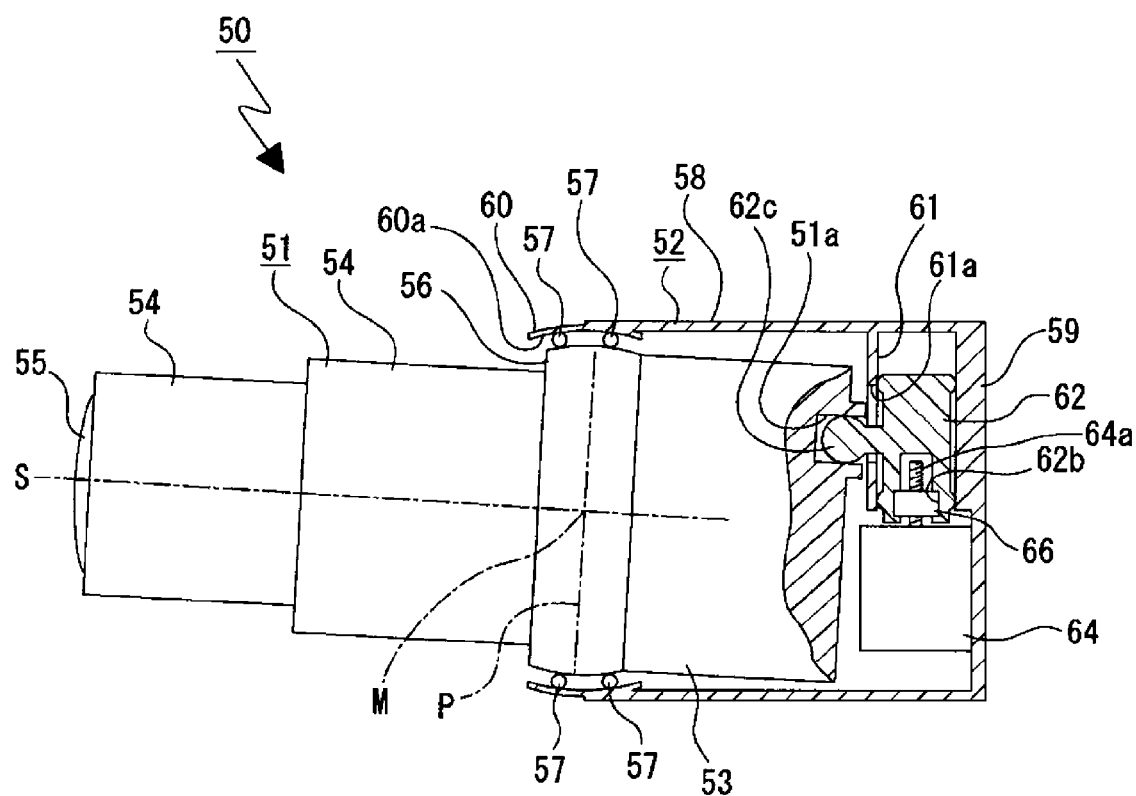
FIG. 17 is a partial cross-sectional side view illustrating a state in which a lens unit has been turned in a second direction.
Figure 18:
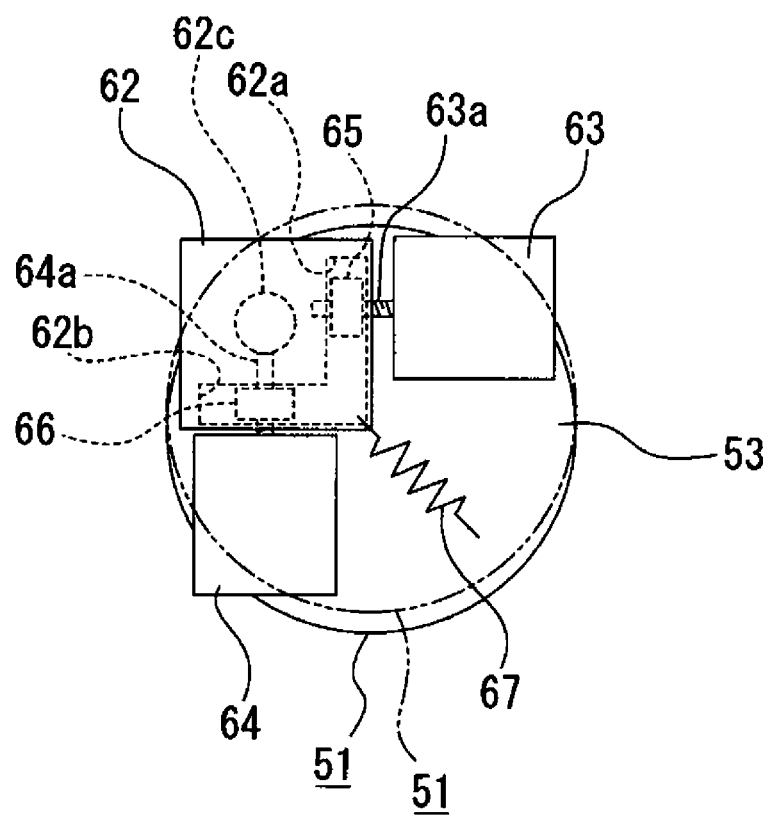
FIG. 18 is a rear view illustrating a state in which a lens unit has been turned in a second direction.
Figure 19:
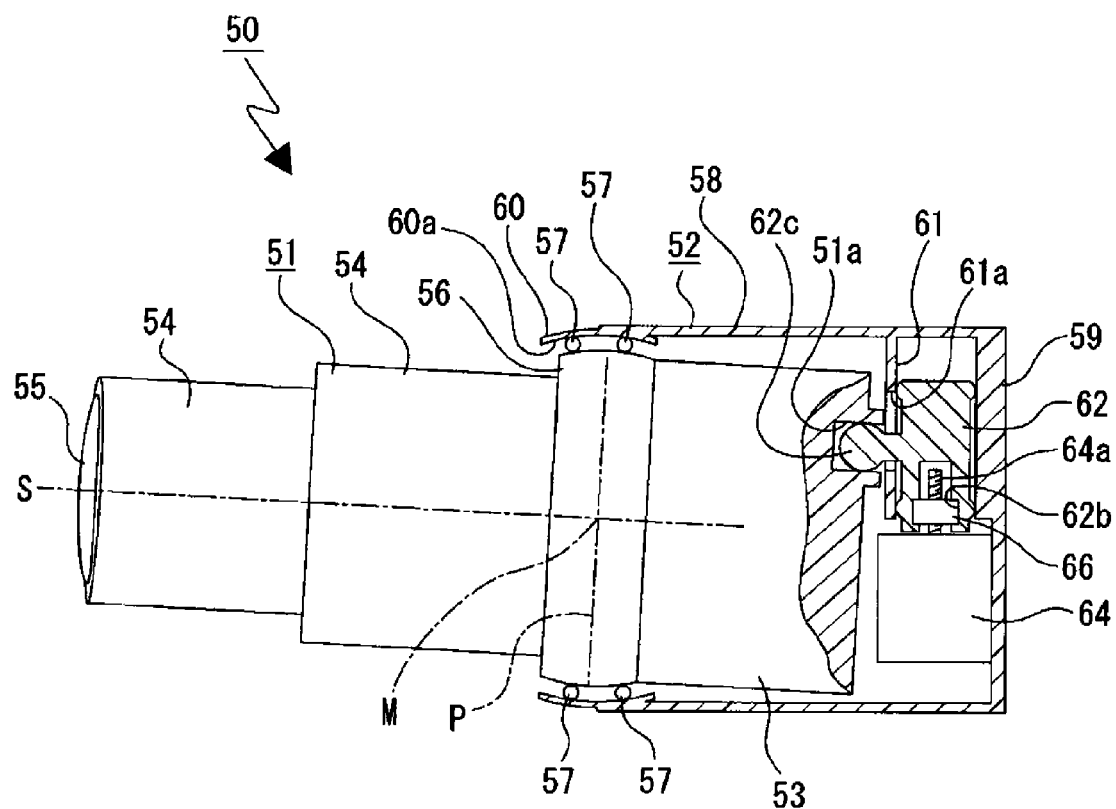
FIG. 19 is a partial cross-sectional side view illustrating a state in which a lens unit has been turned in a first direction and a second direction.
Figure 20:
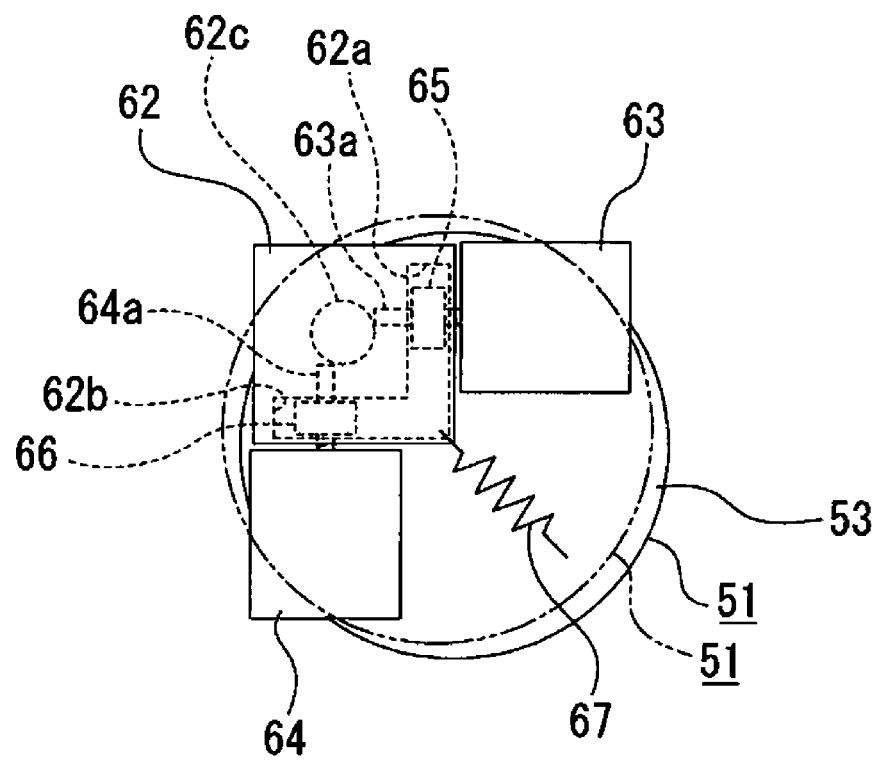
FIG. 20 is a rear view illustrating a state in which a lens unit has been turned in a first direction and a second direction.

In a state before the blur correction operation is carried out, the image blur correction apparatus 50 is at a reference position where there has been no turning in the first direction or the second direction (refer to FIGS. 13 and 14).

In the image blur correction apparatus 50, when the first drive unit 63 is rotated, the first movement member 65 screwed on the motor shaft 63a is moved in the horizontal direction. In conjunction with the movement of the first movement member 65, the coupling member 62 is moved in the horizontal direction (refer to FIGS. 15 and 16). At this stage, the second tolerance portion 62b of the coupling member 62 slides in the horizontal direction with respect to the second movement member 66 screwed on the motor shaft 64a of the second drive unit 64. When the coupling member 62 is moved in the horizontal direction, the lens unit 51 coupled by the coupling portion 62c is turned in the first direction about the first axis, whereby a correction operation is carried out.

On the other hand, in the image blur correction apparatus 50, when the second drive unit 64 is rotated, the second movement member 66 screwed on the motor shaft 64a is moved in the vertical direction. In conjunction with the movement of the second movement member 66, the coupling member 62 is moved in the vertical direction (refer to FIGS. 17 and 18). At this stage, the first tolerance portion 62a of the coupling member 62 slides in the vertical direction with respect to the first movement member 65 screwed on the motor shaft 63a of the first drive unit 63. When the coupling member 62 is moved in the vertical direction, the lens unit 51 coupled by the coupling portion 62c is turned in the second direction about the second axis, whereby a correction operation is carried out.

Further, in the image blur correction apparatus 50, when the first drive unit 63 and the second drive unit 64 are rotated, the first movement member 65 screwed on the motor shaft 63a is moved in the horizontal direction, and the second movement member 66 screwed on the motor shaft 64a is moved in the vertical direction. In conjunction with the movement of the first movement member 65, the coupling member 62 is moved in the horizontal direction, and in conjunction with the movement of the second movement member 66, the coupling member 62 is moved in the vertical direction (refer to FIGS. 19 and 20). At this stage, the second tolerance portion 62b of the coupling member 62 slides in the horizontal direction with respect to the second movement member 66 screwed on the motor shaft 64a of the second drive unit 64, and the first tolerance portion 62a of the coupling member 62 slides in the vertical direction with respect to the first movement member 65 screwed on the motor shaft 63a of the first drive unit 63. When the coupling member 62 is moved in the horizontal direction and moved in the vertical direction, the lens unit 51 coupled by the coupling portion 62c is turned in the first direction about the first axis and turned in the second direction about the second axis, whereby a correction operation is carried out.

In the above-described blur correction operation, since the coupling member 62 is biased by the biasing spring 67 in a direction between the axis direction of the first axis and the axis direction of the second axis, the coupling member 62 is moved without any rattling, and the lens unit 51 is turned with a high degree of precision. Especially, the occurrence of rattle caused by backlash between the motor shafts 63a and 64b and the first movement member 65 and second movement member 66 can be prevented.

Imaging Apparatus Embodiment

Figure 21:
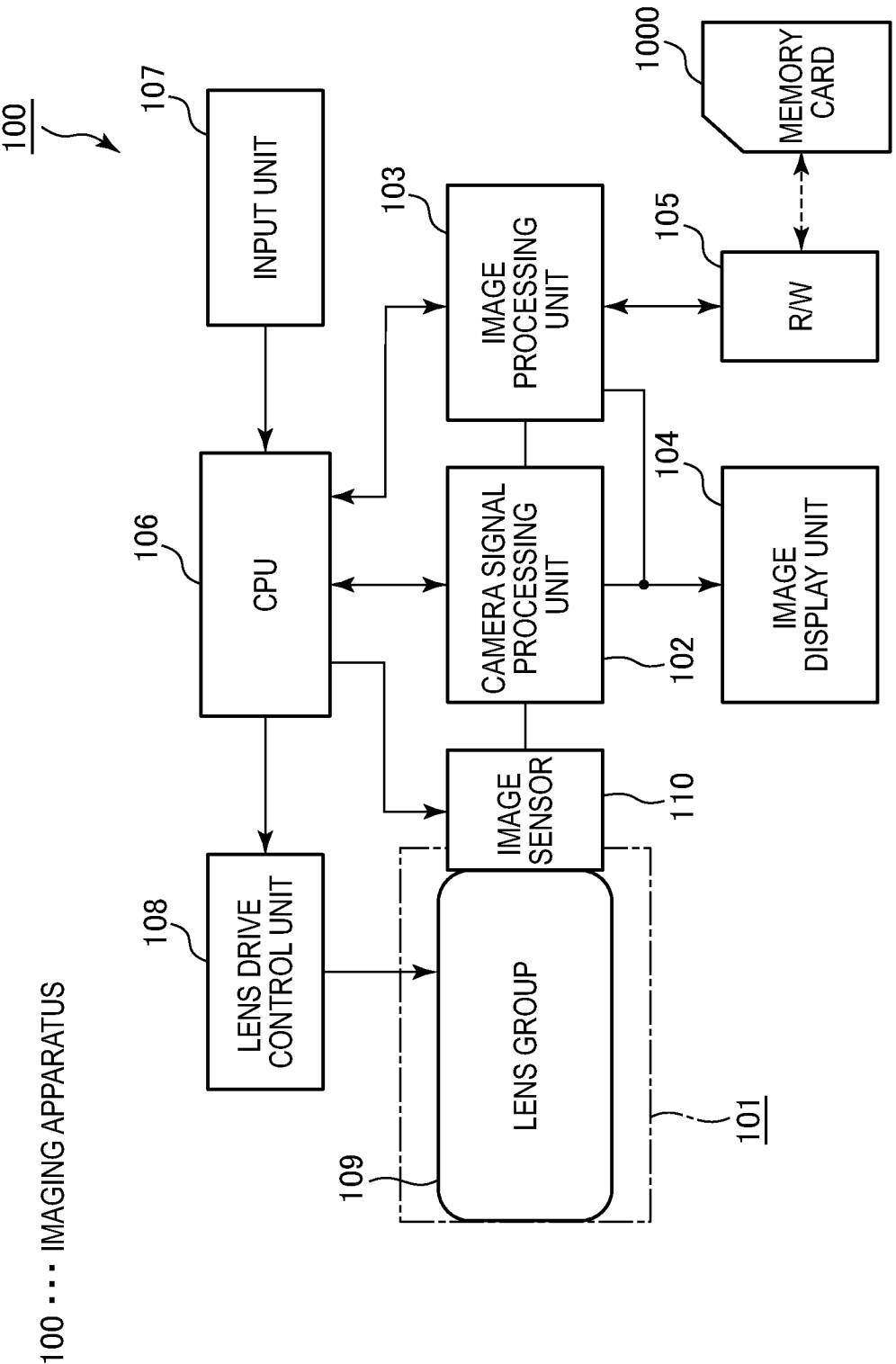
FIG. 21 is a block diagram of an imaging apparatus.

FIG. 21 illustrates a block diagram of a still camera according to an embodiment of the imaging apparatus of the present technology.

An imaging apparatus (still camera) 100 (corresponding to the imaging apparatus 1) has a lens unit 101 (corresponding to lens units 21 and 51) that is responsible for an imaging function, a camera signal processing unit 102 that performs signal processing such as analog-digital conversion of a captured image signal, and an image processing unit 103 that performs recording and playback processing of the image signal. Further, the imaging apparatus 100 includes an image display unit 104 such as a liquid crystal panel, which displays captured images and the like, a R/W (reader/writer) 105 that reads/writes image signals from/to a memory card 1000, a CPU (central processing unit) 106 that controls the whole imaging apparatus 100, an input unit 107 (corresponding to operating unit 3) configured from various switches and the like, on which operations are performed by the user, and a lens drive control unit 108 that controls the drive of the lenses arranged in the lens unit 101.

The lens unit 101 is configured from, for example, an optical system that includes a lens group 109 (corresponding to the lens group provided in the lens units 21 and 51), and an image sensor 110 such as a CCD (charge-coupled device) or a CMOS (complementary metal-oxide semiconductor) and the like.

The camera signal processing unit 102 performs various types of signal processing, such as conversion of an output signal from the image sensor 110 into a digital signal, noise reduction, image correction, and conversion into luminance/color difference signal.

The image processing unit 103 performs, for example, compression and encoding/decompression and decoding of image signals based on a predetermined image data format, and conversion processing of the data specification, such as the resolution.

The image display unit 104 has a function for displaying various data, such as an operation state and captured images, on the input unit 107 of the user.

The R/W 105 performs writing of the image data encoded by the image processing unit 103 onto the memory card 1000 and reading of the image data recorded on the memory card 1000.

The CPU 106 functions as a control processing unit that controls the respective circuit blocks provided in the imaging apparatus 100, and controls the respective circuit blocks based on instruction input signals and the like from the input unit 107.

The input unit 107 is configured from, for example, a shutter release lever for performing a shutter operation, and a selection switch for selecting an operation mode. The input unit 107 outputs instruction input signals to the CPU 106 based on the operation made by the user.

The lens drive control unit 108 controls (not illustrated) motors and the like that drive the respective lenses of the lens group 109 based on control signals from the CPU 106.

The memory card 1000 is, for example, a semiconductor memory that can be inserted into and removed from a slot connected to the R/W 105.

The operations performed by the imaging apparatus 100 will now be described.

In an imaging standby state, under the control of the CPU 106, an image signal captured by the lens unit 101 is output to the image display unit 104 via the camera signal processing unit 102, and is displayed as a camera still image. Further, when an instruction input signal for zooming is input from the input unit 107, the CPU 106 outputs a control signal to the lens drive control unit 108, and a predetermined lens in the lens group 109 is moved based on a control from the lens drive control unit 108.

When a (not illustrated) shutter in the lens unit 101 is operated by an instruction input signal from the input unit 107, the captured image signal is output from the camera signal processing unit 102 to the image processing unit 103, subjected to compression and encoding processing, and is converted into digital data having a predetermined data format. The converted data is output to the R/W 105, and is written in the memory card 1000.

Focusing and zooming are performed by the lens drive control unit 108 moving a predetermined lens in the lens group 109 based on a control signal from the CPU 106.

When playing back image data recorded in the memory card 1000, based on an operation on the input unit 107, predetermined image data is read from the memory card 1000 by the R/W 105, and decompression and decoding processing is performed by the image processing unit 103. Then, the playback image signal is output to the image display unit 104, and the playback image is displayed.

[Conclusion]

As described above, in the imaging apparatus 1, lens units 21 and 51 are extended/retracted in the light axis direction, support barrels 23 and 53 are supported on fixed members 22 and 52, and support barrels 23 and 53 are turnably supported in two different directions about two axes that are orthogonal to each other.

Therefore, since lens units 21 and 51 are turned in at least two different directions because support barrels 23 and 53 are supported on fixed members 22 and 52, the configuration can be made simpler and more compact.

Further, since fixed members 22 and 52 are arranged inside the outer housing 2, fixed members 22 and 52 do not protrude from the outer housing 2, so that the apparatus can be made substantially more compact.

In addition, since first drive units 40 and 60 and second drive units 41 and 64 are arranged on the outer face side of kens units 21 and 51 in the light axis direction, first drive units 40 and 60 and second drive units 41 and 64 are not present in the direction orthogonal to the light axis, so that the apparatus can be made more compact in the direction orthogonal to the light axis.

Still further, in image blur correction apparatuses 20 and 50, supported portions 26 and 56 are provided on the front edge portion of support barrels 23 and 53, respectively, and support portions 29 and 60 that support supported portions 26 and 56 are provided on the front edge portion of fixed members 22 and 52.

Therefore, a gap is less likely to form between the lens unit and the fixed member when the lens unit is turned, so that it is not necessary to provide a member to block the gap, the configuration can be simplified, and the entry of dust into the fixed member can be prevented.

Further, when movable barrels 24 and 24, 54 and 54 are protruding from support barrels 23 and 53, the center of gravity of lens units 21 and 51 is supported on fixed members 22 and 52, so that a good balance for lens units 21 and 51 with respect to gravity can be ensured, lens units 21 and 51 can be turned with a small drive force, and blur correction apparatuses 20 and 50 can be made more compact due to a reduction in the size of the drive unit.

[Present Technology]

Additionally, the present technology may also be configured as below.

(1) An image blur correction apparatus including:

a lens unit configured to include at least one lens, and configured to be turnable in two different directions using, as supporting points, two axes that are orthogonal to an outer housing;

a fixed member configured to turnably support the lens unit in the two directions;

a first drive unit configured to be attached to the fixed member, and configured to turn the lens unit in one of the two directions; and a second drive unit configured to be attached to the fixed member, and configured to turn the lens unit in another of the two directions, wherein the lens unit, which includes a movable barrel configured to hold an optical element and configured to be movable in a light axis direction, and a support barrel configured to movably support the movable barrel in the light axis direction, is extended and retracted by the movable barrel moving in the light axis direction, and wherein the support barrel is turnably supported by the fixed member in the two directions.

(2) The image blur correction apparatus according to (1), wherein the movable barrel is extended forward in the light axis direction with respect to the support barrel when power is turned on.

(3) The image blur correction apparatus according to (1) or (2), wherein the first drive unit and the second drive unit are arranged on an outer face side in the light axis direction of the support barrel in the fixed member.

(4) The image blur correction apparatus according to any one of (1) to (3), wherein the fixed member is arranged in the outer housing.

(5) The image blur correction apparatus according to any one of (1) to (4), wherein the first drive unit and the second drive unit are arranged on an outer face side of the lens unit in the light axis direction.

(6) The image blur correction apparatus according to (4) or (5), wherein a supported portion is provided at an edge portion on an object side of the support barrel, and wherein a support portion that supports the supported portion is provided at an edge portion on an object side of the fixed member.

(7) The image blur correction apparatus according to (6), wherein the fixed member is positioned on an outer side of the lens unit, wherein an inner side protrusion that protrudes inwards is provided at a position that is further toward an image side than the support portion of the fixed member, and wherein a slanted face is formed on an inner face of the inner side protrusion, the slanted face being father from a light axis with increase in a distance from the support portion.

(8) The image blur correction apparatus according to any one of (1) to (7), wherein the lens unit is turnable using, as a supporting point, an axis orthogonal to the two axes.

(9) An imaging apparatus including:

an image blur correction apparatus configured to include a lens unit that includes at least one lens and an outer housing that has the lens unit arranged therein, wherein the lens unit is configured to correct image blur by being turnable in two different directions using, as supporting points, two axes that are orthogonal to the outer housing, and wherein the image blur correction apparatus includes a fixed member configured to turnably support the lens unit in the two directions, a first drive unit configured to be attached to the fixed member and configured to turn the lens unit in one of the two directions, and a second drive unit configured to be attached to the fixed member and configured to turn the lens unit in another of the two directions, wherein the lens unit, which has a movable barrel configured to hold an optical element and configured to be turnable in a light axis direction, and a support barrel configured to movably support the movable barrel in the light axis direction, is extended and retracted by the movable barrel moving in the light axis direction, and wherein the support barrel is turnably supported by the fixed member in the two directions.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2012-122336 filed in the Japan Patent Office on May 29, 2012, the entire content of which is hereby incorporated by reference.

What is claimed is:

1. An image blur correction apparatus comprising:
a lens unit configured to include at least one lens, and configured to be turnable in two different directions along two axes that are orthogonal to an outer housing;
a fixed member configured to turnably support the lens unit in the two different directions;
a first drive unit configured to be attached to the fixed member, and configured to turn the lens unit in one of the two different directions; and
a second drive unit configured to be attached to the fixed member, and configured to turn the lens unit in another of the two different directions,
wherein the lens unit, which includes a movable barrel configured to hold an optical element and configured to be movable in a light axis direction, and a support barrel configured to movably support the movable barrel in the light axis direction, is extended and retracted by the movable barrel moving in the light axis direction, and
wherein the support barrel is turnably supported by the fixed member to turn along the two axes, and
wherein a spherically shaped supported portion is provided on an outer periphery of the support barrel to turnably support the lens unit.

2. The image blur correction apparatus according to claim 1, wherein the movable barrel is extended forward in the light axis direction with respect to the support barrel when power is turned on.

3. The image blur correction apparatus according to claim 1, wherein the first drive unit and the second drive unit are arranged on an outer face side in the light axis direction of the support barrel in the fixed member.

4. The image blur correction apparatus according to claim 1, wherein the fixed member is arranged in the outer housing.

5. The image blur correction apparatus according to claim 1, wherein the first drive unit and the second drive unit are arranged on an outer face side of the lens unit in the light axis direction.

6. The image blur correction apparatus according to claim 1, wherein the supported portion is provided at an edge portion on an object side of the support barrel, and wherein a support portion that supports the supported portion is provided at an edge portion on an object side of the fixed member.

7. The image blur correction apparatus according to claim 6, wherein the fixed member is positioned on an outer side of the lens unit, wherein an inner side protrusion that protrudes inwards is provided at a position that is further toward an image side than the support portion of the fixed member, and wherein a slanted face is formed on an inner face of the inner side protrusion, the slanted face being farther from a light axis with an increase in a distance from the support portion.

8. The image blur correction apparatus according to claim 1, wherein the lens unit is turnable along an axis orthogonal to the two axes.

9. An imaging apparatus comprising:
an image blur correction apparatus configured to include:
- a lens unit that includes at least one lens and an outer housing that has the lens unit arranged therein, wherein the lens unit is configured to correct image blur by being turnable in two different directions along two axes that are orthogonal to the outer housing;
- a fixed member configured to turnably support the lens unit in the two different directions;
- a first drive unit configured to be attached to the fixed member and configured to turn the lens unit in one of the two different directions; and
- a second drive unit configured to be attached to the fixed member and configured to turn the lens unit in another of the two different directions;

wherein the lens unit, which has a movable barrel configured to hold an optical element and configured to be turnable in a light axis direction, and a support barrel configured to movably support the movable barrel in the light axis direction, is extended and retracted by the movable barrel moving in the light axis direction, and wherein the support barrel is turnably supported by the fixed member to turn along the two axes, and wherein a spherically shaped supported portion is provided on an outer periphery of the support barrel to turnably support the lens unit.

* * * * *